3,459,680
CRYSTALLINE ZEOLITE COMPOSITE FOR CATALYTIC HYDROCARBON CONVERSION
Charles J. Plank, Woodbury, and Edward J. Rosinski, Deptford, N.J., assignors to Mobil Oil Corporation, a corporation of New York
No Drawing. Continuation of application Ser. No. 471,721, July 13, 1965, which is a continuation-in-part of application Ser. No. 380,986, June 30, 1964. This application Jan. 2, 1969, Ser. No. 796,263
Int. Cl. B01j *11/40;* C07c *3/36;* C01b *33/26*
U.S. Cl. 252—455                                    19 Claims

ABSTRACT OF THE DISCLOSURE

The invention relates to an improved catalyst composition and its method of preparation. The catalyst has a total sodium content of less than about 4 percent by weight and comprises a porous matrix in combination with a crystalline aluminosilicate zeolite, the cations of which consist essentially of metal characterized by a substantial portion of rare earth metal.

---

This application is a continuation of Ser. No. 471,721 field July 13, 1965 and now abandoned, which is a continuation-in-part of one or more of the following applications:

Ser. No. 159,626 filed Dec. 15, 1961, abandoned Aug. 20, 1965
Ser. No. 161,237 filed Dec. 21, 1961, abandoned Nov. 9, 1965
Ser. No. 195,430 filed May 17, 1962
Ser. No. 210,215 filed July 16, 1962, abandoned Sept. 13, 1965
Ser. No. 242,594 filed Dec. 6, 1962, abandoned Sept. 20, 1965
Ser. No. 242,648 filed Dec. 6, 1962, abandoned Nov. 7, 1965
Ser. No. 380,015 filed July 2, 1964, abandoned July 22, 1965
  which in turn are each a continuation-in-part of Ser. No. 42,284 filed July 12, 1960 and issued as U.S. 3,140,249 on July 7, 1964
Ser. No. 348,318 field Feb. 6, 1964, abandoned Aug. 19, 1965, which in turn is a division of Ser. No. 210,215 filed July 16, 1962, abandoned Sept. 13, 1965, wherein Ser. No. 471,721 is also a continuation of application Ser. No. 449,603, filed Apr. 20, 1965, now U.S. 3,210,267 which, in turn, is a continuation-in-part of Ser. No. 210,215, filed July 16, 1962, abandoned Sept. 13, 1965, which is a continuation-in-part of Ser. No. 42,284 filed July 12, 1960, now U.S. 3,140,249
Ser. No. 380,986 filed June 30, 1964, abandoned Nov. 18, 1966, which in turn is a continuation of Ser. No. 42,284 filed July 12, 1960, and issued as U.S. 3,140,249 on July 7, 1964
Ser. No. 380,665 filed July 6, 1964, abandoned Aug. 13, 1966, which in turn is a continuation of Ser. No. 364,301 filed May 1, 1964 and issued as U.S. 3,140,253 on July 7, 1964.

The invention described herein relates to processes for transforming organic compounds catalytically convertible in the presence of acidic catalyst sites. Such conversion processes include, by way of example, cracking (including hydrocracking), alkylation, isomerization, polymerization, aromatization and dealkylation.

The invention is concerned with an improved composite catalyst composition for use in such conversion processes. The composite comprises a high activity component which is a crystalline aluminosilicate having an ordered structure of rigid three-dimensional networks characterized by pores and having openings of nearly uniform diameter in the range of greater than 4 and less than 15 angstrom units. The remainder of the composite comprises material which possesses a lower order of catalytic activity than the crystalline aluminosilicate component. Although it may be non-porous and/or catalytically inert, the remainder of the composite preferably comprises a porous material which possesses substantial catalytic activity which is, however, of a lower order than that of the crystalline aluminosilicate. The crystalline aluminosilicate component may be dispersed throughout the remainder of the composite, which will sometimes hereinafter be referred to as the matrix, by simple mechanical admixture, of finely divided particles of the components, or in a variety of other ways which will be made clear hereinafter.

In a particular embodiment, the present invention relates to the catalytic conversion of a hydrocarbon charge into lower boiling normally liquid and normally gaseous products and to an improved cracking catalyst characterized by unusual attrition resistance, activity, selectivity and stability to deactivation by steam. While the description which follows is directed, for the most part, to cracking of hydrocarbon charge stocks, it is within the purview of this invention to utilize the catalyst as such or with suitable modification, as hereinafter described, in other processes catalyzed by the presence of acidic catalyst sites.

As is well known, there are numerous materials, both of natural and synthetic origin, which have the ability to catalyze the cracking of hydrocarbons. However, the mere ability to catalyze cracking is far from sufficient to afford a catalyst of commercial significance. Of the presently commercially available cracking catalysts, a synthetic silica-alumina composite catalyst is by far the most widely used. While such type catalyst is superior in many ways to the earlier employed clay catalysts and is fairly satisfactory, it is subject to improvement, particularly in regard to its ability to afford a high yield of useful product with a concomitant small yield of undesired product.

Modern catalytic processes, moreover, require catalysts which are not only specifically active in the chemical reactions which are to be catalyzed but also possess physical characteristics required for successful commercial operation. One of the outstanding physical attributes of a commercial catalyst is the ability to resist attrition. The ability of a particle to hold its shape in withstanding the mechanical handling to which it is subjected upon storage, shipment and use is a primary requirement for a successful catalyst and for modern catalytic processes.

Thus, commercial catalytic cracking has been carried out by contacting a hydrocarbon charge in the vapor or liquid state with a catalyst of the type indicated hereinabove under conditions of temperature, pressure and time to achieve substantial conversion of the charge to lower boiling hydrocarbons. Such cracking processes are generally advantageously carried out employing methods wherein the catalyst is subjected to continuous handling. In these operations, a continuously moving stream of catalyst is provided for the accomplishment of conversion and thereafter the catalyst is continuously regenerated and returned to the conversion zone. This continuous handling and regeneration of the catalyst particles results in considerable breakage and constant abrasion, consuming the catalyst and giving rise to an excessive amount of fines which are a loss since they generally cannot be reused in the same catalytic equipment. Furthermore, there is a tendency for the catalyst fines suspended in the gas or vapor present to act as an abrasive in a manner analogous to sand blasting. This not only wears away the equipment but also causes the catalyst to take up foreign matter detrimental to its catalytic properties. A hard porous catalyst having the ability to withstand abrasion during the necessary handling involved during continual conversion and regeneration is definitely to be desired.

During catalytic conversion of high boiling hydrocarbons to lower boiling hydrocarbons, the reaction which takes place is essentially a cracking to produce lighter hydrocarbons but is accompanied by a number of complex side reactions, such as aromatization, polymerization, alkylation and the like. As a result of these complex reactions, a hydrocarbonaceous deposit is laid down on the catalyst commonly called "coke." The deposition of coke tends to seriously impair the catalytic efficiency of the catalyst for the principal reaction and the conversion reaction is thereafter suspended after coke to the extent of a few percent by weight has accumulated on the catalyst. The catalytic surface is then regenerated by burning the coke in a stream of oxidizing gas and the catalyst is returned to the conversion stage of the cycle.

As will be realized, coke and other undesired products are formed at the expense of useful products, such as gasoline. It will also be evident that during the period of regeneration, the catalyst is not being effectively employed for conversion purposes. It accordingly is highly desirable not only to afford a large overall conversion of the hydrocarbon charge, i.e., to provide a catalyst of high activity, but also to afford an enhanced yield of useful product, such as gasoline, while maintaining undesired product, such as coke, at a minimum. The ability of a cracking catalyst to so control and to direct the course of conversion is referred to as selectivity. Thus, an exceedingly useful and widely sought characteristic in a cracking catalyst is high selectivity.

Another important property desirable in a cracking catalyst is steam stability, i.e., the ability not to become deactivated in the presence of steam at an excessively high rate. As a result of coke formation, it has generally been necessary to regenerate the catalyst at frequent intervals, first by stripping out entrained oil by contacting with steam and then burning off the carbonaceous deposits by contacting with an oxygen-containing gas at an elevated temperature. However, it has been found that the cracking activity of the catalyst deteriorates upon repeated use and regeneration and the silica-alumina catalysts heretofore employed have been sensitive to steaming. Since steaming has been found to be the most effective way of removing entrained oil from the spent catalyst prior to thermal regeneration with air and since steam is encountered in the seals and kiln of a commercial catalytic cracking unit, it is apparent that a catalyst characterized by good steam stability is definitely to be desired.

Inorganic oxide amorphous gels heretofore employed as hydrocarbon conversion catalysts have generally been prepared by the formation of a sol of desired composition that sets to a hydrogel after lapse of a suitable period of time. The hydrogel is then dried to remove the liquid phase therefrom. It has heretofore been suggested that various finely divided water-insoluble solids be added to the sol before the same undergoes gelation for the purpose of increasing the porosity of the ultimate dried gel so that the regeneration characteristics thereof are enhanced upon use in catalytic hydrocarbon conversion operations. It has also been proposed that pulverized dried gel, clay and similar materials be incorporated in the hydrosol before gelation in order that the hydrogel resulting upon setting of such hydrosol may be subjected to rapid drying without undergoing substantial breakage. The improved regeneration characteristics and the improvement in drying obtained have been attributed to the fact that the finely divided solid contained in the hydrosol does not shrink to the extent that the hydrogel does during drying, thereby creating in the resulting dried gel a large number of macropores having diameters greater than about 1000 angstrom units. While the gels so prepared containing pulverized material of appreciable particle size exhibit improvement in regeneration and during drying, the physical strength thereof has been weakened due to the presence of large pores in the gel structure.

Gel preparation has heretofore been carried out by drying hydrogel in a mass, which is subsequently broken up into pieces of desired size. Hydrogel has also been prepared and dried in the form of small pieces of predetermined shape such as obtained by extrusion, pelleting or other suitable means. In more recent years, gels have been produced in the form of spheroidal or microspheroidal shape which have been found to be less susceptible to attrition.

Prior to the present invention, a considerable number of materials have been proposed as catalysts for the conversion of hydrocarbons into one or more desired products. In the catalytic cracking of hydrocarbon oils, for example, wherein hydrocarbon oils of higher boiling range are converted into hydrocarbons of lower boiling range, notably hydrocarbons boiling in the motor fuel range, the catalysts most widely used are solid materials which behave in an acidic manner whereby hydrocarbons are cracked. Acidic catalysts of this type possess many desired characteristics, but have limited activity, selectivity and stability. For example, synthetic silica-alumina gel composites, the most successful of such catalysts heretofore used, provide limited yields of gasoline for a given yield of coke. Other such catalysts less widely used inctude those materials of an argillaceous nature, e.g., bentonite, halloysite, kaolin and montmorillonite, which generally have been subjected to prior acid treatment. Catalysts of this general type are relatively inexpensive, but are only moderately active, and exhibit a decline in activity over periods of many conversions and regeneration cycles. Some synthetic materials, such as silica-magnesia gels, are more active than conventional silica-alumina catalysts, but have the disadvantage of producing a gasoline product of low octane number. Materials of these same types have been used as the acid components, in conjunction with hydrogenation components, in hydrocracking catalysts.

It has previously been shown in our patents U.S. 3,140,249 and U.S. 3,140,253, that crystalline aluminosilicates having uniform pores in which a substantial proportion of original alkali metal content has been replaced with other metal cations and/or hydrogen ions constitute a new, highly efficacious class of catalysts for catalytic cracking of hydrocarbons.

The alkali metal crystalline aluminosilicate zeolites, e.g., sodium faujasite, although substantially as active as the conventional silica-alumina amorphous gel catalysts, give a product distribution which is very similar to that of thermal cracking and completely different from that obtained with silica-alumina gel. Stated differently, the selectivity of alkali metal zeolites is extremely poor compared even to silica-alumina. Additionally, certain alkali metal zeolites as found or produced are quite unstable to steam treatment. For these reasons, the natural and synthetic alkali metal zeolites as found or produced are generally totally unsatisfactory for use as commerial cracking catalysts.

In accordance with the present invention, there are now provided novel catalytic compositions which are highly efficacious for effecting catalytic conversion of organic compounds, especially petroleum hydrocarbons. These catalytic compositions are characterized by a low sodium content and comprise an intimate admixture of a porous matrix material and a crystalline aluminosilicate zeolite, the cations of which consist essentially, or primarily, of metal characterized by a substantial portion of rare earth metal, and a structure of rigid three-dimensional networks characterized by pores having a minimum cross-section of 4 to 15 angstroms, preferably between 6 and 15 angstrom units extending in three dimensions.

As will be brought out more clearly hereinbelow, in the preferred embodiment of the invention, the porous matrix is characterized by substantial catalytic activity, but of an appreciably lower order than that of the crystalline aluminosilicate with which it is combined.

In other embodiments of the invention, the porous matrix may be catalytically inert, or substantially so.

These embodiments are based in part on the discovery that while crystalline aluminosilicates as above defined containing cations which are primarily metal ions, especially rare earth ions, and a lowered proportion of alkali metal cations (especially sodium) are highly active catalysts for hydrocarbon conversion, many unusual and unique effects and safeguards are obtained by admixing such crystalline aluminosilicate catalysts with materials which possess a lower order of catalytic activity than the aluminosilicate component.

While in the catalytic cracking of hydrocarbon oils into hydrocarbon products of lower molecular weight, for example, the reaction rates per unit volume of catalyst that are obtainable by use of the crystalline aluminosilicates above referred to vary up to many thousand times the rates achieved with the best siliceous catalysts heretofore proposed, as a practical matter it is neither possible nor practical to utilize such high reaction rates when catalytic cracking is performed with methods currently in use or available.

Accordingly, one object of the present invention is to intermix such crystalline aluminosilicate catalysts with a material which will dilute and temper the activity thereof so that currently available cracking equipment and methods may be employed, thereby avoiding rapid and sudden obsolescence thereof, while permitting the beneficial properties of such zeolite catalysts to be commercially enjoyed to the greatest extent practicable.

In the preferred embodiments, there are utilized materials which do more than perform a passive role in serving as a diluent, surface extender or control for the highly active zeolite catalyst component. Consonant therewith, in these embodiments, the highly active crystalline aluminosilicate zeolite catalysts referred to above, are combined with a major proportion of a catalytically active material which, in such combination, will enhance the production of gasoline of higher octane values than are produced by cracking with such zeolitic catalyst alone, while concomitantly providing a composite catalyst composition which may be used at much higher space velocities than those suitable for the best prior catalysts, and which composite catalyst composition also has greatly superior properties of product selectivity and steam stability. Cracking may be effected in the presence of said composite catalyst composition utilizing well-known currently available techniques including, for example, those wherein the catalyst is employed as a fluidized mass, as dispersed in vapor, or as a compact practicle-form moving bed.

The crystalline aluminosilicates employed in preparation of the instant catalyst may be either natural or synthetic zeolites. Representative of particularly preferred zeolites are the faujasites, including the synthetic materials such as Zeolite X described in U.S. 2,882,244, Zeolite Y described in U.S. 3,130,007 as well as other crystalline aluminosilicate zeolites having pore openings of between 6 and 15 angstroms. These materials are essentially the dehydrated forms of crystalline hydrous siliceous zeolites containing varying quantities of alkali metal and aluminum, with or without other metals. The alkali metal atoms, silicon, aluminum and oxygen in these zeolites are arranged in the form of an aluminosilicate salt in a definite and consistent crystalline pattern. The structure contains a large number of small cavities intreconnected by a number of still smaller holes or channels. These cavities and channels are uniform in size. The alkali metal aluminosilicate used in preparation of the present catalyst has a highly ordered crystalline structure characterized by pores having openings of uniform sizes within the range greater than 4 and less than 15 angstroms, preferably between 6 and 15 angstroms, the pore openings being sufficiently large to admit the molecules of the hydrocarbon charge desired to be converted. The preferred crystalline aluminosilicates will have a rigid three-dimensional network characterized by a system of cavities and interconnecting ports or pore openings, the cavities being connected with each other in three dimensions by pore openings or ports which have minimum diameters of greater than 6 angstrom units and less than 15 angstrom units. A specific typical example of such a structure is that of the mineral faujasite.

The zeolite catalysts which comprise the high activity component of the composite catalyst composition of the invention are natural or synthetic alkali metal crystalline aluminosilicates which have been treated to replace all or at least a substantial proportion of the original alkali metal ions with other cations, primarily metal cations, characterized by a substantial portion of rare earth cations. Other metal cations which can be used in conjunction with rare earth to replace the original alkali metal ions include calcium, magnesium, manganese, chromium, aluminum, zirconium, vanadium, nickel, cobalt, iron and mixtures of one or more of foregoing. The particular metal or metal cation chosen will depend primarily upon the particular conversion process for which the catalyst is intended. When the catalyst is to be used for cracking, a major portion of the alkali metal cations of the zeolite are preferably replaced by rare earth metal cations, alone. In this embodiment, for example, substantially all of the original alkali metal ions may be replaced by rare earth, or a major proportion of the original alkali metal ions may be replaced by rare earth cations, and a minor proportion with calcium, manganese, or magnesium cations, or mixtures thereof.

Metal compounds and particularly metal salts broadly represent the source of the metal cations which will replace the original alkali metal ions of the natural or synthetic zeolites. The chemical treatment of the natural or synthetic zeolites with a medium containing a compound of the desired replacement metal, including rare earth, results in a crystalline aluminosilicate having a structure modified primarily to the extent of having cations of the desired replacement metal chemisorbed or ionically bonded thereto. A characteristic of the product of this exchange is the fact that the sum of equivalents of alkali metal ion and of other metal ions will substantially equal the number of gram atoms of aluminum in the aluminosilicate, the equivalent weight of rare earth being based on a valence of three.

In carrying out the replacement reaction, the initial crystalline alkali metal aluminosilicate zeolite is suitably treated as by contact or otherwise with a liquid or solid medium containing a compound capable of replacing by base exchange a substantial portion of the alkali metal content of the aluminosilicate with rare earth cations alone or together with one or more of the aforenoted other metal cations. Preferably, the alkali metal crystalline aluminosilicate will be contacted with a fluid medium having dissolved therein a compound or compounds containing the desired replacement metal or metals to accomplish at least part of the desired base exchange. Exchange of the alkali metal aluminosilicate zeolite may be accomplished before and/or after admixture with the matrix material.

When fluid exchange is employed, the concentration of replacing cation in the fluid exchange medium may vary within wide limits depending upon the precursor aluminosilicate, and its silica to alumina ratio. Where the aluminosilicate has a molar ratio of silica to alumina in excess of 6, the fluid exchange medium may have a pH of from 3 to 12; with a silica to alumina ratio between 5 and 6, the fluid medium may have a pH of from 3.5 to 12, and preferably 4.5 to 8.5; with a molar ratio of silica to alumina of less than 5, the fluid exchange medium has a permissible pH from 4.5 to 12, and preferably 4.5 to 8.5. Thus, depending on the silica to alumina ratio of the precursor aluminosilicate, the pH of the exchange medium varies within rather wide limits. Precursor aluminosilicates having a silica to alumina ratio of about 2.3 to 6.0 are preferred for use herein.

In carrying out the treatment with the fluid exchange medium, the procedure employed comprises contacting the aluminosilicate with the desired fluid medium until such time as the alkali metal cations present are substantially removed. Elevated temperatures tend to hasten the speed of treatment whereas the duration thereof varies inversely with the concentration of ions in the fluid medium. In general, the temperatures employed will range from below ambient room temperature of about 24° C. up to temperatures below the decomposition temperatures of the aluminosilicate. Following the fluid treatment, the treated aluminosilicate may be washed with water, preferably distilled or deionized water, until the effluent wash water has a pH of between 5 and 8.

The actual procedure employed for carrying out fluid treatment of the aluminosilicate may be accomplished in a batchwise or continuous method under atmospheric, sub-atmospheric or super-atmospheric pressure. A solution of the ions to be introduced in the form of an aqueous or non-aqueous solution may be passed slowly through the fixed bed of an aluminosilicate. If desired, hydrothermal treatment or a corresponding non-aqueous treatment with polar solvents may be effected by introducing the aluminosilicate and fluid medium in a closed vessel maintained under autogenous pressure.

A wide variety of compounds of the metals noted hereinabove may be employed with facility as a source of replacing ions. Operable metal compounds generally include those which are sufficiently soluble in the fluid medium employed to afford the necessary ion transfer. Usually metal salts such as the chlorides, nitrates and sulfates are employed.

As aforenoted, particular preference is accorded herein to the rare earth metal cations. Representative of the rare earth metals are cerium, lanthanum, praseodymium, neodymium, promethium (sometimes known as illinium), samarium, europium, gadolinium, terbium, ytterbium, dysprosium, holmium, erbium, thulium, lutetium, and also the closely related elements scandium and yttrium.

The rare earth metal salts employed can either be the salt of a single rare earth metal or mixtures of rare earth metals, such as rare earth chlorides or didymium chlorides. As hereinafter referred to, a rare earth chloride solution is a mixture of rare earth chlorides consisting essentially of the chlorides of lanthanum, cerium, neodymium, and praseodymium with minor amounts of samarium, gadolinum and yttrium. Rare earth chloride solutions are commercially available and the ones specifically referred to in the examples contain the chlorides of a rare earth mixture having the relative composition cerium (as $CeO_2$) 48 percent by weight, lanthanum (as $La_2O_3$) 24 percent by weight, praseodynium (as $Pr_6O_{11}$) 5 percent by weight, neodymium (as $Nd_2O_3$) 17 percent by weight, samarium (as $Sm_2O_3$) 3 percent by weight, gadolinium (as $Gd_2O_3$) 2 percent by weight, and other rare earth oxide 0.8 percent by weight. Didymium chloride is also a mixture of rare earth chlorides but having a lower cerium content. It consists of the following rare earths determined as oxides: lanthanum 45–65 percent by weight, cerium 1–2 percent by weight, praseodymium 9–10 percent by weight, neodymium 32–33 percent by weight, samarium 5–7 percent by weight, gadolinium 3–4 percent by weight, yttrium 0.4 percent by weight, and other rare earths 1–2 percent by weight. It is to be understood that other mixtures of rare earths are also applicable for the preparation of the novel compositions of this invention, although lanthanum, neodymium, praseodymium, samarium and gadolinium as well as mixtures of rare earth cations containing a predominant amount of one or more of the above cations are preferred since these metals provide optimum activity for hydrocarbon conversion, including catalytic cracking.

Aluminosilicates which may be chemically treated to replace the original alkali metal cations with other metal cations of the type described include a wide variety of aluminosilicates both natural and synthetic which have a crystalline or combination of crystalline and amorphous structure. However, it has been found that exceptionally superior catalysts can be obtained when the starting aluminosilicate has either a crystalline or a combination of crystalline and amorphous structure and possesses at least 0.4 and preferably 0.6 to 1.0 equivalent of metal cations per gram atom of aluminum. The aluminosilicates can be described as a three-dimensional framework of $SiO_4$ and $AlO_4$ tetrahedra in which the tetrahedra are cross linked by the sharing of oxygen atoms whereby the ratio of total aluminum and silicon atoms to oxygen atoms is 1:2. In their hydrated form, the aluminosilicates may be represented by the formula:

$$M_{2/n}O:Al_2O_3:wSiO_2:yH_2O$$

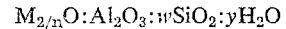

wherein M represents at least one cation which balances the electrovalence of the tetrahedra, $n$ represents the valence of the cation, $w$ the moles of $SiO_2$ and $y$ the moles of $H_2O$. The cation can be one or more of a number of metal ions, depending upon whether the aluminosilicate is synthesized or occurs naturally.

Typical cations of the starting aluminosilicates are, in general, the alkali metals and alkaline earth metals, although others may be used. Although the proportions of inorganic oxides in the silicates and their spatial arrangements may vary affecting distinct properties in the aluminosilicates, a main characteristic of these materials is their ability to undergo dehydration and rehydration without substantially affecting the $SiO_4$ and $AlO_4$ framework.

Aluminosilicates falling within the above formulae are well known and include synthesized aluminosilicates, natural aluminosilicates, and aluminosilicates derived from certain caustic treated clays. Since the primary object of this invention is to provide a novel and unusual cracking catalyst, the aluminosilicate zeolite should have a pore size sufficiently large to afford entry and egress of the desired reactant molecules. In this regard, crystalline aluminosilicates having uniform pore openings of a size greater than 4 and less than 15 angstrom units are desired. Particularly preferred aluminosilicates are the faujasites, both natural and the synthetic X and Y types. Aluminosilicates derived from caustic treated clays may also be used. Of the clay materials, monotmorillonite and kaolin families are representative types which include the sub-bentonites, such as bentonite, and the kaolins commonly identified as Dixie, McNamee, Georgia, and Florida clays or others in which the main mineral constituent is halloysite, kaolinite, dickite, nacrite, or anauxite. Such clays may be used in the raw state as originally mined or initially subjected to calcination, acid treatment or chemical modification. One way to render the clays suitable for use is to treat them with sodium hydroxide or potassium hydroxide, preferably in admixture with a source of silica, such as sand, silica gel or sodium silicate, and calcine at temperatures ranging from 230° F. to 1600° F. Following calcination, the fused material is crushed, dispersed in water and digested in the resulting alkaline solution. During the digestion, materials with varying degrees of crystallinity are crystallized out of solution. The solid material is separated from the alkaline material and thereafter washed and dried. The treatment can be effected by reacting mixtures falling within the following weight ratios:

Na$_2$O/clay (dry basis) _____ 1.0–6.6 to 1
SiO$_2$/clay (dry basis) _____ 0.01–3.7 to 1
H$_2$O/Na$_2$O (mole ratio) _____ 35–100 to 1

It is to be understood that mixtures of the various aluminosilicates previously set forth can be employed as well as individual aluminosilicates.

In accordance with the invention, the highly active base-exchanged zeolite or aluminosilicate component of the present catalyst prepared in the foregoing manner is combined, dispersed or otherwise intimately intermixed with a material which possesses a lower order of catalytic activity. A mixture particularly suitable for use in present-day conversion equipment contains a minor proportion, up to 25 percent by weight, of the highly active zeolite catalyst component, preferably ranging from 2 percent to 25 percent by weight in the final composite, while the lower activity material constitutes the balance or the majority of the balance thereof. The incorporation of the zeolite into the catalytically less active material can be accomplished either before, after or during chemical base-exchange treatment of the type described, as well as before, during or after activation of any of the components.

Thus, it is possible to treat an aluminosilicate zeolite with a medium containing a source of the desired replacement ions and then disperse the base-exchanged zeolite throughout the catalytically less active component in any desired manner. Alternatively, the zeolite may be chemically treated to replace the alkali metal ions either during or after admixture with the less active material. In a further embodiment, the zeolite, lower activity material, and a source of the replacement cation or cations may be intermixed and then suitably treated to accomplish the desried replacement of the original alkali metal ions of the zeolite.

The term "material of lower catalytic activity" as used herein includes inorganic compositions with which the aluminosilicate can be incorporated, combined, dispersed or otherwise intimately admixed. It is to be understood that the material with which the aluminosilicate is combined is preferably porous, and/or catalytically active, but these properties can either be inherent in the particular material selected, or they can be introduced by mechanical or chemical means.

In the preferred embodiment, the material with which the aluminosilicate is composited is both porous and catalytically active in order to realize the fullest potential of the novel catayst composition of this invention. The term "catalytically active" as used herein is intended to mean those materials which are capable of effecting at lest 15 percent and preferably more than 20 percent conversion of a Mid-Continent gas oil having a boiling range of 450° F. to 950° F. at a space velocity of 2 LHSV, a catalyst-to-oil ratio of 3.0 at a temperature of 900° F. and substantially atmospheric pressure. Thermal conversion at these conditions is not more than about 5 percent. In other words, the matrix material utilized in the preferred catalyst of this invention is sufficiently active to effect more than three times the conversion attributable solely to thermal conversion.

Representative active matrices which can be employed include preferably those silica-alumina catalysts known to have high octane number producing properties, e.g., silica-alumina gels, and certain raw clays, or raw clays which have been acid-treated. Other catalytically active matrix materials which may be used include inorganic oxides such as silica gel, alumina gel, and alumina-boria composites. Other gels suitable as matrices include those of silica-zirconia, silica-magnesia, silica-thoria, silica-rare earth oxide, silica-beryllia, silica-titania, as well as ternary combinations such as silica-alumina-thoria, silica-alumina-zirconia, silica-alumina-magnesia, and silica-magnesia-zirconia. Of the foregoing gels, silica is generally present as the major component, and the other oxides of metals are present in minor proportion. Siliceous hydrogels utilized herein may be prepared by any method wall known in the art, such as, for example, hydrolysis of etheyl ortho silicate, acidification of an alkali metal silicate which may contain a compound of a metal, the oxide of which it is desired to cogel with silica, etc. The choice of porous matrix material will depend to some extent on the objectives sought. Thus, where a high yield of gasoline is desired, silica gel having sufficient inherent cracking activity to meet the above noted standard may be a preferred matrix. Where gasoline, in somewhat what lower yield, but of high octane number is desired, silica-alumina is a preferred matrix.

Where the matrix material itself inherently possesses relatively high catalytic activity, it may be desirable to treat the matrix to render it catalyically less active. A notable example of matrix materials possessing high catalytic activity is silica-alumina gel. This material has itself been used as a conversion catalyst and has considerable catalytic activity by conventional standards. Such a matrix is preferably treated so that its activity is substantially decreased. Deactivation of a matrix, such as silica-alumina gel, may be carried out by severe heating or by steaming the material by exchanging with ions such as calcium or rare earths, or a combination of any of the foregoing treatments.

It will be understood that in the preferred catalyst of the present invention, the catalytically active crystalline aluminosilicate component is contained in and distributed throughout a porous matrix characterized by a substantial but lower catalytic activity per unit weight than said crystalline aluminosilicate.

Catalytic compositions of the invention can be prepared by several methods wherein the aluminosilicate is reduced to a particle size less than 40 microns, preferably less than 10 microns, and intimately admixed with the matrix material. For example, when an inorganic oxide gel is used as the matrix, the mixture may be made while the gel is in a hydrous state such as in the form of a hydrosol, hydrogel, wet gelatinous precipitate, or mixtures thereof. Thus, finely divided active alumino-silicates can be mixed directly with a siliceous gel formed by hydrolyzing a basic solution of alkali metal silicate with an acid such as hydrochloric, sulfuric, etc. The mixing of the two components can be accomplished in any desired manner, such as in a ball mill or other types of mills. The aluminosilicate also may be dispersed in a hydrosol obtained by reacting an alkali metal silicate with an acid or alkaline coagulant. The hydrosol is then permitted to set in mass to a hydrogel which is thereafter dried and broken into pieces of desired shape or dried by conventional spray drying techniques or dispersed through a nozzle into a bath of oil or other water-immiscible suspending medium to obtain spheroidally shaped "bead" particles of catalyst such as described in United States Patent 2,384,946. The aluminosilicate-siliceous gel composite thus obtained is washed free of soluble salts and thereafter dried and/or calcined as desired. The total alkali meal content of the reulting composite, including alkali metals which may be present in the aluminosilicate as an impurity, is less than about 4 percent and preferably less than about 1 percent by weight based on the total composition. If an inorganic oxide gel matrix is employed having too high an alkali metal content, the alkali metal content can be reduced by suitable chemical treatment, as by base-exchange, either before or after drying.

As the catalytically active inorganic oxide matrix may also be used a raw or natural clay, a calcined clay or a clay which has been chemically treated, e.g., with an acid medium or an alkali medium, or both. The aluminosilicate can be incorporated in the clay simply by mechanically blending the two compounds. The resulting admixture may itself serve as the catalyst composite, or it may be formed into more desirable shapes, as by extrusion. Suitable clays include attapulgite, kaolin, sepiolite, polygarskite, kaolinite, plastic ball clays, bentonite, montmorillonite, illite, chlorite, and halloysite. Of the foregoing, kaolinite, halloysite and montmorillonite clays are preferred.

In accordance with other embodiments of the invention, the use as matrices of materials failing to meet the catalytically active standard set forth herein is contemplated. Thus, substantially catalytically inert materials, including powdered metals, such as aluminum and stainless steel, and powders of refractory oxides such as α-alumina, having very low internal pore volume may be used. Other materials include silicon carbide, sintered alumina, sintered glass, pumice, asbestos, firebrick and the like. It should be noted that minor amounts of such inert materials may either occur adventitiously in the active matrix embodiment of the invention, or may be deliverately introduced into that embodiment for such purposes as modifying specific heat, density and similar properties of the active matrix containing composite.

It will be understood, however, that the active matrix embodiment requires the presence in the composite of a substantial quantity of matrix materials which of itself has catalytic cracking activity, or is capable of acquiring catalytic cracking activity, albeit of a substantially lower order than that of the active zeolite component for which it serves both as a matrix and to supply some of the physical and catalytic effects in which the zeolite may be deficient or become deficient during extended use. In particular, the active matrix material desirably should possess substantial ability to effect conversion to gasoline of relatively high octane number, and in this respect the silica-alumina gels and clays have been found superior.

Catalytically active matrices of the type described also serve to siphon off coke and thus reduce the amount of coke that would otherwise form on the active aluminosilicate component.

In all embodiments, it is important that there be a low content of alkali metal cations, e.g., Na, associated with the zeolite since the presence of alkali metal cations tends to suppress or limit catalytic properties, the activity of which as a general rule decreases with increasing content of alkali metal cations. Thus, for best results there should be a substantial reduction in the sodium content of the zeolite component of the composite catalyst. The overall amount of alkali metal cations which can be tolerated in the composite catalyst will vary depending on the particular aluminosilicate and the catalytic use involved. The total amount of alkali metal should be less than 4 percent by weight of the composite, and preferably less than 3 percent. In use, the amount of exchangeable alkali metal should be less than 1 percent by weight of the composite. For cracking operations, the total amount of Na in the composite of zeolite and matrix should be less than about 1 percent when aluminosilicates are used which have a silica to alumina ratio less than about 3. For aluminosilicates having a silica to alumina ratio greater than 3, the total alkali metal content should be less than 4 percent by weight, preferably less than 3 percent by weight, based on the final composite. When the matrix material itself is sodium free, a greater amount of sodium or alkali metal may be tolerated in the zeolite ingredient.

The catalyst product is preferably subjected to thermal activation, either separately before introduction into the catalytic cracking unit or during residence and use in such unit. Such activation, which results in increased production, entails heating the composition in an atmosphere which does not adversely affect the catalyst such as air, nitrogen, hydrogen, flue gas, helium or other inert gas. Generally, the catalyst undergoing such treatment is heated in air to a temperature in the approximate range of 500° F. to 1500° F. for a period of at least 1 hour, and usually between 1 and 48 hours.

The catalytic selectivity of the composite increases upon exposure to steam. Exposure of the catalyst to steam is, as will appear from data set forth hereinafter, a highly desirable step in obtaining a product capable of affording an enhanced yield of gasoline. Steam treatment may be carried out at a temperature within the approximate range of 800° F. to 1500° F. for at least about 2 hours. Usually, steam at a temperature of about 1000° F. to 1300° F. will be used with the treating period extending from about 2 to about 100 hours. Temperatures above 1500° F. may be detrimental and should generally be avoided. Also, an atmosphere consisting of a substantial amount of steam, say at least about 10 percent by volume, but containing air or other gas substantially inert with respect to the composite being treated may be used and such mixtures may, in some instances, be desirable with the use of the more elevated temperatures to avoid possible deactivation of the catalyst. Exposure to steam treatment may occur in use, as well as prior to use.

The cracking activity of the catalyst is illustrated by its ability to catalyze the conversion of a Mid-Continent gas oil to gasoline having an end point of 410° F. Vapors of the gas oil are passed through the catalyst at temperatures of 875° F. or 900° F. substantially at atmospheric pressure at a feed rate of 1.5 (LHSV) to 8.0 volumes of liquid oil per volume of catalyst per hour for ten minutes. The method of measuring the instant catalyst was to compare the various product yields obtained with such catalyst with yields of the same products given by conventional silica-alumina catalyst at the same conversion level. The differences ($\Delta$ values) shown hereinafter represent the yields given by the present catalyst minus yields given by the conventional catalyst. These tests will sometimes hereinafter be referred to as CAT-C evaluations.

Cracking, utilizing the catalyst described herein, may be carried out at catalytic cracking conditions employing a temperature within the approximate range of 700° F. to 1200° F. and under a pressure ranging from subatmospheric pressure up to several hundred atmospheres. The contact time of the oil with the catalyst is adjusted in any case according to the conditions, the particular oil feed and the particular results desired to give a substantial amount of cracking to lower boiling products. Cracking may be effected in the presence of the instant catalyst utilizing well-known techniques including, for example, those wherein the catalyst is employed as a fluidized mass, fixed bed, or as a compact particle-form moving bed.

The catalysts of the present invention are especially suitable for use in both the "moving bed" and "fluid" cracking processes. In the "moving-bed process" (e.g. Thermofor Catalytic Cracking or TCC) catalyst particles are used which are generally in the range of about 0.08 to 0.25 inch in diameter. Useful reaction conditions include temperatures above about 850° F., pressures from subatmospheric to approximately 3 atmospheres, catalyst to oil ratios of about 1.5–15 and liquid hourly space velocities of about 0.5 to 6. In the "fluidized catalytic cracking" process (or FCC) catalyst particles are used which are generally in the range of 10 to 150 microns in diameter. The commercial FCC processes include one or both of two types of cracking zones—a dilute bed (or "riser") and a fluid (or dense) bed. Useful reaction conditions in fluid catalytic cracking include temperatures above 850° F., pressures from subatmospheric to three atmospheres, catalyst-to-oil ratios of 1 to 30, oil contact time less than about 12 to 15 seconds in the "riser," preferably less than about 6 seconds, wherein up to 100% of the desired conversion may take place in the "riser," and a catalyst residence (or contact) time of less than 15 minutes, preferably less than 10 minutes, in the fluidized (or dense) bed.

The following comparative examples serve to illustrate the advantages of the process and catalyst of the present invention without limiting the same.

EXAMPLE 1

Crystalline sodium aluminosilicate characterized by a structure having a uniform effective pore diameter in the range of 6 to 15 angstrom units was prepared by admixture of the following solutions:

A. Sodium silicate solution:                              Lbs.
    Water _____ 143
    Sodium hydroxide (77.5% $Na_2O$) _____ 11
    Sodium silicate (28.8% $SiO_2$) _____ 77.5
                                                         ———
                                                         231.5

B. Sodium aluminate solution:
    Water _____ 195
    Sodium hydroxide (77.5% $Na_2O$) _____ 11
    Sodium aluminate (43.5% $Al_2O_3$) (and
        30.2% $Na_2O$) _____ 25.6
                                                         ———
                                                         231.6

Solution B having a specific gravity at 111° F. of 1.128 was added to Solution A, having a specific gravity of 1.172 at 68° F. with vigorous agitation to form a creamy slurry. The resulting slurry was heated for 12 hours at 205° F. and was thereafter filtered. The filter cake was washed with water until the water in equilibrium with the washed solid had a pH of 11. The washed filter cake was then dried in air at a temperature of 280° F.

Twenty-five parts of the finely divided sodium aluminosilicate was incorporated into a silica-alumina gel resulting from admixture of the following materials:

A. Sodium silicate solution:                         Wt. percent
    Sodium silicate ($Na_2O/SiO_2$=0.3/1) _____ 47.4
    Water _____ 43.7
    Sodium aluminosilicate powder containing 55%
        solids at 230° F. _____ 8.85

B. Acid solution:
    Water _____ 93.34
    Aluminum sulfate _____ 3.43
    Sulfuric acid _____ 3.23

Solution A having a specific gravity of 1.202 at 76° F. and Solution B having a specific gravity of 1.057 at 76° F. were continuously mixed together through a mixing nozzle using 362 cc. per minute of the silicate solution at 73° F. and 350 cc. per minute of the acid solution at 40° F. The resulting hydrosol, containing 25 percent by weight dispersed crystalline sodium aluminosilicate powder, on a finished catalyst basis, was formed into hydrogel beads at 64° F. with a gelation time of 2.3 seconds at a pH of 8.5 by introducing globules of the sol into an oil medium.

The resulting hydrogel beads where then treated with a 2 percent by weight aqueous solution of rare earth chlorides derived from monazite sand and containing cerium chloride along with the chlorides of praseodymium, lanthanum, neodymium and samarium. The treatments were carried out for nine 2 hour contacts and three overnight contacts of approximately 18 hours each. The aluminosilicate was then washed with water until there were no chloride ions in the effluent, dried for 20 hours at 275° F. in air, calcined in air for 10 hours at 1000° F. and then treated with 100% steam at atmospheric pressure for 20 hours at 1225° F.

The resulting catalyst had a sodium content of 0.44 percent by weight and a total rare earth oxide content of about 15 weight percent (primarily lanthanum and neodymium, with some samarium and cerium).

The following cracking data was obtained when the catalyst was evaluated for cracking gas oil at 875° C.

Cracking data

Conversion, volume percent _____ 74.8
LHSV _____ 3.0
10 R.V.P. gaso., vol. percent _____ 57.4
Excess $C_4$'s, vol. percent _____ 16.8
$C_5$+gasoline, vol. percent _____ 55.0
Total $C_4$'s, vol. percent _____ 19.3
Dry gas, wt. percent _____ 7.8
Coke, wt. percent _____ 6.1
$H_2$, wt. percent _____ 0.03

Δ advantage

10 R.V.P. gaso., vol. percent _____ +9.6
Excess $C_4$'s, vol. percent _____ −6.4
$C_5$+gasoline, vol. percent _____ +9.6
Total $C_4$'s, vol. percent _____ −6.3
Dry gas, wt. percent _____ −2.7
Coke, wt. percent _____ −2.5

EXAMPLE 2

Twenty-five parts by weight of a synthetic crystalline aluminosilicate identified as Zeolite 13X were dispersed into 75 parts by weight of a silica-alumina matrix consisting of 94 percent by weight $SiO_2$ and 6 percent by weight $Al_2O_3$. The resulting composition was treated with a 2-percent by weight aqueous solution of rare earth chlorides for 12 contacts, each contact being 2 hours in duration. The aluminosilicate composition was then washed with water until there were no chloride ions in the effluent, dried and then treated for 24 hours at 1200° F. with steam at 15 p.s.i.g. to yield a catalyst having a rare earth content, determined as rare earth oxide, of 15.5 percent and a sodium content of 0.28 percent.

The following cracking data was obtained when the catalyst was evaluated for cracking gas oil at 900° F.

Cracking data

Conversion, volume percent _____ 65.9
LHSV _____ 4
10 R.V.P. gaso., vol. percent _____ 52.9
Excess $C_4$'s, vol. percent _____ 13.4
$C_5$+gasoline, vol. percent _____ 50.8
Total $C_4$'s, vol. percent _____ 15.5
Dry gas, wt. percent _____ 7.7
Coke, wt. percent _____ 4.2
$H_2$, wt. percent _____ 0.04

Δ advantage

10 R.V.P., gaso., vol. percent _____ +5.3
Excess $C_4$'s, vol. percent _____ −2.7
$C_5$+gasoline, vol. percent _____ +5.3
Total $C_4$'s, vol. percent _____ −2.6
Dry gas, wt. percent _____ −1.1
Coke, wt. percent _____ −1.5

EXAMPLE 3

The procedure of Example 2 was repeated with the exception that a 2 percent by weight aqueous solution of lanthanum chloride was employed in place of the rare earth chloride solution. The resulting catalyst contained 0.35 percent by weight sodium and 14.9 percent by weight lanthanum determined as lanthanum oxide and had the cracking data listed below.

Cracking data

Conversion, volume percent _____ 68
LHSV _____ 4
10 R.V.P. gaso., vol. percent _____ 57.1
Excess $C_4$'s, vol. percent _____ 13.1
$C_5$+gasoline, vol. percent _____ 54.6
Total $C_4$'s, vol. percent _____ 6.9

Δ advantage

| | |
|---|---|
| 10 R.V.P., gaso., vol. percent | +8.3 |
| Excess $C_4$'s, vol. percent | −4.1 |
| $C_5$+gasoline, vol. percent | +7.9 |
| Total $C_4$'s, vol. percent | −3.6 |
| Dry gas, wt. percent | −2.3 |
| Coke, wt. percent | −2.4 |

EXAMPLE 4

The procedure of Example 2 was repeated with the exception that a 2 percent by weight aqueous solution of cerium chloride was employed in place of the rare earth chlorides. The resulting catalyst contained 0.29 percent by weight sodium and 15.3 percent by weight cerium, determined as cerium oxide, and had the cracking data listed below.

Cracking data

| | |
|---|---|
| Conversion, volume percent | 63 |
| LHSV | 4 |
| 10 R.V.P. gaso., vol. percent | 53.1 |
| Excess $C_4$'s, vol. percent | 11.4 |
| $C_5$+gasoline, vol. percent | 50.9 |
| Total $C_4$'s, vol. percent | 13.7 |
| Dry gas, wt. percent | 6.5 |
| Coke, wt. percent | 3.7 |
| $H_2$, wt. percent | 0.03 |

Δ advantage

| | |
|---|---|
| 10 R.V.P., gaso., vol. percent | +6.8 |
| Excess $C_4$'s, vol. percent | −3.5 |
| $C_5$+gasoline, vol. percent | +6.8 |
| Total $C_4$'s, vol. percent | −3.3 |
| Dry gas, wt. percent | −1.7 |
| Coke, wt. percent | −1.4 |

EXAMPLE 5

The procedure of Example 2 was repeated with the exception that a 2 percent by weight aqueous solution of didymium chloride was employed in place of the rare earth chloride solution. The resulting catalyst had a sodium content of 0.32 percent by weight and a rare earth content of 15.4 percent by weight, and had the cracking data listed below.

Cracking data

| | |
|---|---|
| Conversion, volume percent | 61.4 |
| LHSV | 4 |
| 10 R.V.P., gaso., vol. percent | 49.3 |
| Excess $C_4$'s, vol. percent | 12.2 |
| $C_5$+gasoline, vol. percent | 47.1 |
| Total $C_4$'s, vol. percent | 14.4 |
| Dry gas, wt. percent | 6.8 |
| Coke, wt. percent | 4.2 |
| $H_2$, wt. percent | 0.16 |

Δ advantage

| | |
|---|---|
| 10 R.V.P., gaso., vol. percent | +3.8 |
| Excess $C_4$'s, vol. percent | −2.1 |
| $C_5$+gasoline, vol. percent | +3.7 |
| Total $C_4$'s, vol. percent | −2.2 |
| Dry gas, wt. percent | −1.1 |
| Coke, wt. percent | −0.5 |

EXAMPLE 6

Five parts by weight of a synthetic crystalline aluminosilicate identified as Zeolite 13X were dispersed in 95 parts of a silica-alumina matrix consisting of 94 percent by weight $SiO_2$ and 6 percent by weight $Al_2O_3$. The resulting composition was treated with a 2 percent by weight aqueous solution of rare earth chlorides for 12 contacts, each contact being 2 hours in duration. The aluminosilicate was then washed with water until there were no chloride ions in the effluent, dried and then treated for 24 hours at 1200° F. with steam at 15 p.s.i.g. to yield a catalyst having a 0.07 weight percent sodium content and a 12.2 weight percent rare earth content, determined as rare earth oxides.

The following cracking data was obtained when the catalyst was evaluated for cracking gas oil at 900° F.

Cracking data

| | |
|---|---|
| Conversion, volume percent | 53.3 |
| LHSV | 4 |
| 10 R.V.P., gaso., vol. percent | 46.8 |
| Excess $C_4$'s, vol. percent | 9.0 |
| $C_5$+gasoline, vol. percent | 44.5 |
| Total $C_4$'s, vol. percent | 11.3 |
| Dry gas, wt. percent | 5.5 |
| Coke, wt. percent | 1.8 |
| $H_2$, wt. percent | 0.07 |

Δ advantage

| | |
|---|---|
| 10 R.V.P. gaso., vol. percent | +5.3 |
| Excess $C_4$'s, vol. percent | −2.5 |
| $C_5$+gasoline, vol. percent | +5.4 |
| Total $C_4$'s, vol. percent | −2.5 |
| Dry gas, wt. percent | −1.0 |
| Coke, wt. percent | −1.6 |

EXAMPLE 7

The procedure of Example 6 was repeated with the exception that a 2 percent by weight aqueous solution of lanthanum chloride was employed in place of the rare earth chloride solutioin. The resulting catalyst contained 0.10 percent by weight sodium and 11.6 percent by weight lanthanum determined as lanthanum oxide. It had the cracking data listed below.

Cracking data

| | |
|---|---|
| Conversion, volume percent | 54.5 |
| LHSV | 4 |
| 10 R.V.P. gaso., vol. percent | 49.1 |
| Excess $C_4$'s, vol. percent | 8.8 |
| $C_5$+gasoline, vol. percent | 46.6 |
| Total $C_4$'s, vol. percent | 11.4 |
| Dry gas, wt. percent | 5.3 |
| Coke, wt. percent | 1.5 |
| $H_2$, wt. percent | 0.03 |

Δ advantage

| | |
|---|---|
| 10 R.V.P. gaso., vol. percent | +7.1 |
| Excess C's, vol. percent | −3.2 |
| $C_5$+gasoline, vol. percent | +6.8 |
| Total $C_4$'s, vol. percent | −2.9 |
| Dry gas, wt. percent | −2.3 |
| Coke, wt. percent | −3.0 |

EXAMPLE 8

The procedure of Example 6 was repeated with the exception that a 2 percent by weight aqueous solution of cerium chloride was employed in place of the rare earth chloride. The resulting catalyst contained 0.07 percent by weight sodium and 12.4 weight percent of cerium determined as cerium oxide. It had the cracking data listed below.

Cracking data

| | |
|---|---|
| Conversion, volume percent | 51.8 |
| LHSV | 4 |
| 10 R.V.P. gaso., vol. percent | 45.5 |
| Excess $C_4$'s, vol. percent | 8.7 |
| $C_5$+gasoline, vol. percent | 43.2 |
| Total $C_4$'s, vol. percent | 11.0 |
| Dry gas, wt. percent | 5.3 |
| Coke, wt. percent | 1.7 |
| $H_2$, wt. percent | 0.02 |

Δ advantage

| | |
|---|---|
| 10 R.V.P. gaso., vol. percent | +5.0 |
| Excess C$_4$'s, vol. percent | −2.3 |
| C$_5$+gasoline, vol. percent | +4.9 |
| Total C$_4$'s, vol. percent | −2.4 |
| Dry gas, wt. percent | −1.0 |
| Coke, wt. percent | −1.5 |

EXAMPLE 9

10 parts by weight of the synthetic crystalline aluminosilicate identified as Zeolite 13X were dispersed into 90 parts by weight of a silica-alumina rare earth oxide matrix consisting of 91 parts by weight of SiO$_2$, 6 parts by weight of Al$_2$O$_3$, 3 parts by weight of rare oxides (Re$_2$O$_3$). The resulting composition was treated with a 2 percent aqueous solution of rare earth chlorides for 24 continuous hours, washed with water, dried and then treated for 24 hours at 1200° F. with steam at 15 p.s.i.g. to yield a catalyst having a rare earth content determined as rare earth oxides of 16.7 percent by weight and a sodium content of 0.15 percent by weight.

The following cracking data was obtained when the catalyst was evaluated for cracking gas oil at 990° F.

Cracking data

| | |
|---|---|
| Conversion, volume percent | 56.8 |
| LHSV | 4 |
| 10 R.V.P. gaso., vol. percent | 49.4 |
| Excess C$_4$'s, vol. percent | 10.0 |
| C$_5$+gasoline, vol. percent | 47.0 |
| Total C$_4$'s, vol. percent | 12.4 |
| Dry gas, wt. percent | 5.6 |
| Coke, wt. percent | 2.8 |
| H$_2$, wt. percent | 0.04 |

Δ advantage

| | |
|---|---|
| 10 R.V.P. gaso., vol. percent | +6.2 |
| Excess C$_4$'s, vol. percent | −2.6 |
| C$_5$+gasoline, vol. percent | +6.0 |
| Total C$_4$'s, vol. percent | −2.5 |
| Dry gas, wt. percent | −1.5 |
| Coke, wt. percent | −1.2 |

EXAMPLE 10

The procedure of Example 9 was repeated with the exception that the matrix consisted of 97 parts by weight of SiO$_2$ and 3 parts by weight of rare earths determined as rare earth oxides (Re$_2$O$_3$).

The following cracking data was obtained when the catalyst was evaluated for cracking gas oil at 900° F.

Cracking data

| | |
|---|---|
| Conversion, volume percent | 39.4 |
| LHSV | 4 |
| 10 R.V.P. gaso., vol. percent | 36.1 |
| Excess C$_4$'s, vol. percent | 4.1 |
| C$_5$+gasoline, vol. percent | 33.8 |
| Total C$_4$'s, vol. percent | 6.4 |
| Dry gas, wt. percent | 4.1 |
| Coke, wt. percent | 1.6 |
| H$_2$, wt. percent | 0.04 |

Δ advantage

| | |
|---|---|
| 10 R.V.P. gaso., vol. percent | +2.6 |
| Excess C$_4$'s, vol. percent | −3.5 |
| C$_5$+gasoline, vol. percent | +2.7 |
| Total C$_4$'s, vol. percent | −3.6 |
| Dry gas, wt. percent | −0.2 |
| Coke, wt. percent | −0.1 |

EXAMPLE 11

10 parts by weight of a synthetic crystalline aluminosilicate identified as Zeolite 13X were dispersed into 90 parts by weight of a silica-lanthanum oxide matrix consisting of 97 percent by weight SiO$_2$ and 3 percent by weight La$_2$O$_3$. The resulting composition was treated with a 2 percent by weight aqueous solution of lanthanum chloride for 24 continuous hours, washed with water until there were no chloride ions in the effluent, dried and then terated for 24 hours at 1200° F. with steam at 15 p.s.i.g. to yield a catalyst having a lanthanum oxide content of 9.91 weight percent and a sodium content of 0.22 percent by weight.

The following cracking data was obtained when the catalyst was evaluated for cracking gas oil at 900° F.

Cracking data

| | |
|---|---|
| Conversion, volume percent | 51.6 |
| LHSV | 4 |
| 10 R.V.P. gaso., vol. percent | 47.5 |
| Excess C$_4$'s, vol. percent | 6.9 |
| C$_5$+gasoline, vol. percent | 44.8 |
| Total C$_4$'s, vol. percent | 9.6 |
| Dry gas, wt. percent | 4.4 |
| Coke, wt. percent | 1.9 |
| H$_2$, wt. percent | 0.02 |

Δ advantage

| | |
|---|---|
| 10 R.V.P. gaso., vol. percent | +7.0 |
| Excess C$_4$'s, vol. percent | −4.1 |
| C$_5$+gasoline, vol. percent | +6.7 |
| Total C$_4$'s, vol. percent | −3.7 |
| Dry gas, wt. percent | −1.4 |
| Coke, wt. percent | −1.3 |

EXAMPLE 12

The procedure of Example 11 was repeated with the exception that the matrix consisted of 90 percent by weight SiO$_2$, 7 percent by weight La$_2$O$_3$ and 3 percent by weight Al$_2$O$_3$.

The following cracking data was obtained when the catalyst was evaluated for cracking gas oil at 900° C.

Cracking data

| | |
|---|---|
| Conversion, volume percent | 35.4 |
| LHSV | 4 |
| 10 R.V.P. gas., vol. percent | 32.4 |
| Excess C$_4$'s, vol. percent | 4.1 |
| C$_5$+gasoline, vol. percent | 30.4 |
| Total C$_4$'s, vol. percent | 6.1 |
| Dry gas, wt. percent | 3.4 |
| Coke, wt. percent | 1.7 |
| H$_2$, wt. percent | 0.01 |

Δ advantage

| | |
|---|---|
| 10 R.V.P. gas., vol. percent | +1.2 |
| Excess C$_4$'s, vol. percent | −2.5 |
| C$_5$+gasoline, vol. percent | +1.7 |
| Total C$_4$'s, vol. percent | −2.9 |
| Dry gas, wt. percent | −0.3 |
| Coke, wt. percent | +0.2 |

EXAMPLE 13

25 parts by weight of a synthetic crystalline aluminosilicate identified as 13X which had been treated with a rare earth chloride solution were dispersed into 75 parts by weight of a silica-alumina matrix. The resulting composition was further treated with a 2 percent by weight rare earth chloride solution for 24 continuous hours in order to reduce the sodium ion content provided by the matrix to an acceptable level. The composition was then washed with water until there were no chloride ions in the effluent and then dried to yield a catalyst having a rare earth content determined, as rare earth oxides, of 17.6 percent by weight.

The following cracking data was obtained when the catalyst was evaluated for cracking gas oil at 900° F.

Cracking data

| | |
|---|---|
| Conversion, volume percent | 58.5 |
| LHSV | 4 |
| 10 R.V.P. gaso., vol. percent | 43.2 |
| Excess $C_4$'s, vol. percent | 14.5 |
| $C_5$+gasoline, vol. percent | 41.6 |
| Total $C_4$'s, vol. percent | 16.1 |
| Dry gas, wt. percent | 7.7 |
| Coke, wt. percent | 5.0 |
| $H_2$, wt. percent | 0.07 |

EXAMPLE 14

The procedure of Example 13 was repeated with the exception that the catalyst was treated for 20 hours at 1225° F. with atmospheric steam.

The following cracking data was obtained when the catalyst was evaluated for cracking gas oil at 900° F.

Cracking data

| | |
|---|---|
| Conversion, volume percent | 57.7 |
| LHSV | 4 |
| 10 R.V.P. gas., vol. percent | 46.5 |
| Excess $C_4$'s, vol. percent | 11.8 |
| $C_5$+gasoline, vol. percent | 44.6 |
| Total $C_4$'s, vol. percent | 13.7 |
| Dry gas, wt. percent | 6.5 |
| Coke, wt. percent | 4.1 |
| $H_2$, wt. percent | 0.04 |

Δ advantage

| | |
|---|---|
| 10 R.V.P. gas., vol. percent | +2.7 |
| Excess $C_5$'s, vol. percent | −1.1 |
| $C_5$+gasoline, vol. percent | +3.1 |
| Total $C_4$'s, vol. percent | −1.4 |
| Dry gas, wt. percent | −0.8 |
| Coke, wt. percent | −0.1 |

EXAMPLE 15

The procedure of Example 14 was repeated with the exception that 10 percent by weight of a synthetic crystaline alumino-silicate identified as 13X which had been treated with a rare earth chloride solution was incorporated into 90 parts by weight of a silica-alumina matrix to yield a catalyst composition having a sodium content of 0.06 percent by weight.

The following cracking data was obtained when the catalyst was evaluated for cracking gas oil at 900° F.

Cracking data

| | |
|---|---|
| Conversion, volume percent | 55.2 |
| LHSV | 4 |
| 10 R.V.P. gaso., vol. percent | 46.4 |
| Excess $C_4$'s, vol. percent | 11.2 |
| $C_5$+gasoline, vol. percent | 44.5 |
| Total $C_4$'s, vol. percent | 13.2 |
| Dry gas, wt. percent | 5.1 |
| Coke, wt. percent | 3.1 |
| $H_2$, wt. percent | 0.12 |

Δ advantage

| | |
|---|---|
| 10 R.V.P. gas., vol. percent | +4.0 |
| Excess $C_4$'s, vol. percent | −1.0 |
| $C_5$+gasoline, vol. percent | +4.3 |
| Total $C_4$'s, vol. percent | −1.2 |
| Dry gas, wt. percent | −1.7 |
| Coke, wt. percent | −0.6 |

EXAMPLE 16

10 parts by weight of a synthetic crystalline aluminosilicate identified as Zeolite Y were dispersed in 90 parts by weight of a silica-alumina matrix consisting of 94 percent by weight of $SiO_2$ and 5 percent by weight $Al_2O_3$. The resulting composition was treated with a 2 percent by weight aqueous solution of rare earth chlorides for 12 contacts, each contact being for 2 hours in duration. The aluminosilicate composition was then washed with water until there were no chloride ions in the effluent, dried and then treated for 30 hours at 1200° F. with steam at 15 p.s.i.g. to yield a catalyst having a rare earth content determined as rare earth oxides of 10.8 percent by weight and a sodium content of 0.21 percent by weight.

The following cracking data was obtained when the catalyst was evaluated for cracking gas oil at 900° F.

Cracking data

| | |
|---|---|
| Conversion, volume percent | 63.0 |
| LHSV | 4 |
| 10 R.V.P. gaso., vol. percent | 55.2 |
| Excess $C_4$'s, vol. percent | 10.2 |
| $C_5$+gasoline, vol. percent | 52.5 |
| Total $C_4$'s, vol. percent | 12.9 |
| Dry gas, wt. percent | 6.4 |
| Coke, wt. percent | 2.4 |
| $H_2$, wt. percent | 0.03 |

Δ advantage

| | |
|---|---|
| 10 R.V.P. gaso., vol. percent | +8.8 |
| Excess $C_4$'s, vol. percent | −4.8 |
| $C_5$+gasoline, vol. percent | −8.4 |
| Total $C_4$'s, vol. 8% | −4.2 |
| Dry gas, wt. percent | −1.8 |
| Coke, wt. percent | −2.7 |

EXAMPLE 17

10 parts by weight of a synthetic crystalline aluminosilicate identified as Zeolite 13X and 5 parts by weight of a synthetic crystalline aluminosilicate identified as Zeolite A, were dispersed into 85 parts by weight of a silica-alumina matrix consisting of 94 weight percent $SiO_2$ and 6 weight percent $Al_2O_3$. The resulting composition was treated with a 2 percent by weight aqueous solution of rare earth chlorides for 24 continuous hours at room temperature. The aluminosilicate composition was then washed with water until there were no chloride ions in the effluent, dried and then treated for 24 hours at 1200° F. with steam at 15 p.s.i.g. to yield a catalyst having a rare earth content, determined as rare earth oxides, of 11.0 weight percent and a sodium content of 0.04 percent.

The following cracking data was obtained when the catalyst was evaluated for cracking gas oil at 900° F.

Cracking data

| | |
|---|---|
| Conversion, volume percent | 52.8 |
| LHSV | 4 |
| 10 R.V.P. gaso., vol. percent | 45.9 |
| Excess $C_4$'s, vol. percent | 8.6 |
| $C_5$+gasoline, vol. percent | 45.6 |
| Total $C_4$'s, vol. percent | 11.1 |
| Dry gas, wt. percent | 5.5 |
| Coke, wt. percent | 2.4 |
| $H_2$, wt. percent | 0.04 |

Δ advantage

| | |
|---|---|
| 10 R.V.P. gaso., vol. percent | +4.9 |
| Excess $C_4$'s, vol. percent | −2.7 |
| $C_5$+gasoline, vol. percent | +4.7 |
| Total $C_4$'s, vol. percent | −2.6 |
| Dry gas, wt. percent | −0.9 |
| Coke, wt. percent | −0.9 |

Examples 18–21 illustrate the use of crystalline aluminosilicates derived from clays which have been treated with caustic in admixture with a source of silica such as sand, silica gel or sodium silicate, calcined at temperatures ranging from 230° F. to 1600° F., crushed, dispersed in water and digested.

EXAMPLE 18

25 parts by weight of a crystalline aluminosilicate derived from caustic treated Dixie clay were dispersed into 75 parts of a silica-alumina matrix. The resulting composition was then treated with a 2 percent aqueous solution of rare earth chlorides for two continuous contacts, each contact being 24 hours in duration. The composition was then washed with water until the effluent contained no chloride ions, dried and then treated with atmospheric steam for 20 hours at 1225° F. to yield a catalyst having a rare earth content, determined as rare earth oxides of 16.0 weight percent.

The following cracking data was obtained when the catalyst was evaluated for cracking gas oil at 900° F.

Cracking data

| | |
|---|---|
| Conversion, volume percent | 43.1 |
| LHSV | 4 |
| 10 R.V.P. gaso., vol. percent | 41.2 |
| Excess $C_4$'s, vol. percent | 3.6 |
| $C_5$+gasoline, vol. percent | 38.2 |
| Total $C_4$'s, vol. percent | 6.7 |
| Dry gas, wt. percent | 3.9 |
| Coke, wt. percent | 2.0 |
| $H_2$, wt. percent | 0.19 |

Δ advantage

| | |
|---|---|
| 10 R.V.P. gaso., vol. percent | +5.6 |
| Excess $C_4$'s, vol. percent | −4.9 |
| $C_5$+gasoline, vol. percent | +4.9 |
| Total $C_4$'s, vol. percent | −4.3 |
| Dry gas, wt. percent | −0.9 |
| Coke, wt. percent | +0.02 |

EXAMPLE 19

25 parts by weight of a crystalline aluminosilicate derived from caustic treated McNamee clay were dispersed into 75 parts by weight of a silica-alumina matrix and the resulting composition treated with a 2 percent by weight aqueous solution of rare earth chlorides for 2 contacts, each content being 24 continuous hours in duration. The resulting composition was then washed with water until the effluent contained no chloride ions, dried, and then treated for 24 hours with steam at 15 p.s.i.g. and at 1200° F. to yield a catalyst having a sodium content of 0.64 weight percent and a rare earth content, determined as rare earth oxides, of 13.4 weight percent.

The following cracking data was obtained when the catalyst was evaluated for cracking gas oil at 900° F.

Cracking data

| | |
|---|---|
| Conversion, volume percent | 38.3 |
| LHSV | 4 |
| 10 R.V.P. gaso., vol. percent | 36.4 |
| Excess $C_4$'s, vol. percent | 4.7 |
| $C_5$+gasoline, vol. percent | 34.3 |
| Total $C_4$'s, vol. percent | 6.8 |
| Dry gas, wt. percent | 3.3 |
| Coke, wt. percent | 1.3 |
| $H_2$, wt. percent | 0.05 |

Δ advantage

| | |
|---|---|
| 10 R.V.P. gaso., vol. percent | +3.5 |
| Excess $C_4$'s, vol. percent | −2.7 |
| $C_5$+gasoline, vol. percent | +3.8 |
| Total $C_4$'s, vol. percent | −2.9 |
| Dry gas, wt. percent | −0.9 |
| Coke, wt. percent | −0.3 |

EXAMPLE 20

10 parts by weight of a crystalline aluminosilicate derived from caustic treated McNamee clay were dispersed into 90 parts of a silica-alumina matrix and the resulting composition treated with a 2 percent by weight aqueous solution of lanthanum chloride for contacts each being 24 continuous hours in duration. The resulting composition was washed with water until the effluent contained no chloride ions, dried and then treated for 24 hours at 1200° F. with steam at 15 p.s.i.g. to yield a catalyst having a lanthanum content determined as lanthanum oxides of 10.6 weight percent.

The following cracking data was obtained when the catalyst was evaluated for cracking gas oil at 900° F.

Cracking data

| | |
|---|---|
| Conversion, volume percent | 59.3 |
| LHSV | 4 |
| 10 R.V.P. gaso., vol. percent | 51.3 |
| Excess $C_4$'s, vol. percent | 9.7 |
| $C_5$+gasoline, vol. percent | 48.6 |
| Total $C_4$'s, vol. percent | 12.4 |
| Dry gas, wt. percent | 6.1 |
| Coke, wt. percent | 2.4 |
| $H_2$, wt. percent | 0.02 |

Δ advantage

| | |
|---|---|
| 10 R.V.P. gaso., vol. percent | +6.8 |
| Excess $C_4$'s, vol. percent | −3.9 |
| $C_5$+gasoline, vol. percent | +6.3 |
| Total $C_4$'s, vol. percent | −3.3 |
| Dry gas, wt. percent | −1.5 |
| Coke, wt. percent | −2.0 |

EXAMPLE 21

A synthetic crystalline aluminosilicate identified as chabazite was prepared by reacting the following in a furnace for 4 hours at 600° F.

| | | |
|---|---|---|
| Dixie clay | grams | 50 |
| Sodium hydroxide (77.5% $Na_2O$) | do | 81.7 |
| N-brand sodium silicate [1] | do | 536.0 |
| Water | cc | 50.0 |

[1] 28.5 wt.% $SiO_2$, 8.8 wt. % $Na_2O$, 62.7% $H_2O$.

The resulting product was mixed with 250 cc. of water and agitated in a Waring blender. An additional 2628 cc. of water was then added and the resulting slurry digested for 21 hours at 200° F.

After filtering, washing and drying, the product analyzed as follows:

| | Wt. percent |
|---|---|
| Na | 10.9 |
| $Al_2O_3$ | 26.5 |
| $SiO_2$ | 57.8 |

It was determined by X-ray studies to be mainly chabazite.

10 grams of the above chabazite were treated with 30 pounds of a 5% by weight solution of rare earth chlorides for 24 continuous hours at 180° F., washed, dried, pelleted and then calcined in air for 10 hours at 1000° F. to yield a product having a sodium content of 0.19 weight percent.

In like manner, the chabazite can be incorporated in an inorganic oxide gel either before or after treatment with the rare earth chloride solution.

EXAMPLE 22

25 parts by weight of a synthetic crystalline aluminosilicate identified as Zeolite 13X were dispersed into 75 parts by weight of a silica matrix. The resulting composition was treated with a 2 percent by weight aqueous solution of rare earth chlorides for 24 continuous hours. The aluminosilicate composition was then washed with water until there were no chloride ions in the effluent, dried and then treated for 24 hours at 1200° F. with steam at 15 p.s.i.g. to yield a catalyst having a rare earth content, determined as rare earth oxide, of 12.1 weight percent.

The following cracking data was obtained when the catalyst was evaluated for cracking gas oil at 900° F.

Cracking data

| | |
|---|---|
| Conversion, vol. percent | 61.1 |
| LHSV | 4 |
| 10 R.V.P. gaso., vol. percent | 52.3 |
| Excess $C_4$'s, vol. percent | 10.8 |
| Total $C_4$'s, vol. percent | 13.1 |
| Dry gas, wt. percent | 6.2 |
| Coke, wt. percent | 3.3 |
| $H_2$, wt. percent | 0.04 |

Δ advantage

| | |
|---|---|
| 10 R.V.P., gaso., vol. percent | +6.9 |
| Excess $C_4$'s, vol. percent | −3.4 |
| $C_5$+gasoline, vol. percent | +6.8 |
| Total $C_4$'s, vol. percent | −3.2 |
| Dry gas, wt. percent | −1.6 |
| Coke, wt. percent | −1.4 |

EXAMPLE 23

25 parts by weight of a synthetic crystalline aluminosilicate, identified as Zeolite 13X, was dispersed into 75 parts by weight of silica-alumina, and the resulting composition subjected to treatment with an aqueous solution containing 1 percent by weight calcium chloride and 1 percent by weight of rare earth chlorides for 40 continuous hours. The resulting composition was then washed with water until the effluent contained no chloride ions, dried, and then treated for 20 hours at 1225° F. with steam at atmospheric pressure to yield a catalyst having a sodium content of 0.14 percent by weight, a calcium content of 1.5 percent by weight, and a rare earth content of 12.4 percent by weight, determined as rare eath oxides.

The following cracking data was obtained when the catalyst was evaluated for cracking gas oil at 900° F.

Cracking data

| | |
|---|---|
| Conversion, vol. percent | 63.7 |
| LHSV | 4 |
| 10 R.V.P. gaso., vol. percent | 50.3 |
| Excess $C_4$'s, vol. percent | 13.6 |
| $C_5$+gasoline, vol. percent | 47.6 |
| Total $C_4$'s, vol. percent | 16.3 |
| Dry gas, wt. percent | 7.7 |
| Coke, wt. percent | 4.1 |
| $H_2$, wt. percent | 0.03 |

EXAMPLE 24

10 parts by weight of a synthetic crystalline aluminosilicate, identified as Zeolite 13X, was dispersed into 90 parts by weight of silica-alumina consisting of 94 percent by weight of $SiO_2$ and 6 percent by weight of $Al_2O_3$. The resulting composition was then subjected to a 16 continuous hour contact with a 1 percent by weight aluminum sulfate and then to twelve 2 hour contacts with a 2 percent by weight solution of rare earth chlorides. The composition was then washed with water until the effluent contained no chloride or sulfate ions, dried, and then treated for 30 hours at 1200° F. with steam at 15 p.s.i.g. to yield a catalyst having a sodium content of 0.05 percent by weight, and a rare earth content of 11.5 percent by weight determined as rare earth oxides.

The following cracking data was obtained when the catalyst was evaluated for cracking gas oil at 900° F.

Cracking data

| | |
|---|---|
| Conversion, vol. percent | 52.1 |
| LHSV | 4 |
| 10 R.V.P. gaso., vol. percent | 45.1 |
| Excess $C_4$'s, vol. percent | 8.4 |
| $C_5$+gasoline, vol. percent | 42.8 |
| Total $C_4$'s, vol. percent | 10.7 |
| Dry gas, wt. percent | 5.8 |
| Coke, wt. percent | 2.5 |
| $H_2$, wt. percent | 0.04 |

Δ advantage

| | |
|---|---|
| 10 R.V.P. gaso., vol. percent | +4.5 |
| Excess $C_4$'s, vol. percent | −2.8 |
| $C_5$+gasoline, vol. percent | +4.4 |
| Total $C_4$'s, vol. percent | −2.8 |
| Dry gas, wt. percent | −0.5 |
| Coke, wt. percent | −1.0 |

EXAMPLE 25

25 parts by weight of a synthetic crystalline aluminosilicate, identified as Zeolite 13X, was dispersed into 75 parts by weight of silica-alumina consisting of 94 percent by weight $SiO_2$ and 6 percent $Al_2O_3$. The composition was then treated with an aqueous solution of rare earth chloride and manganese chloride, washed with water until there were no chloride ions in the effluent, dried, and then treated for twenty hours at 1225° F. with steam at atmospheric pressure to yield a catalyst having a sodium content of 0.57 percent by weight, a manganese content of 1.2 percent by weight, and a rare earth content of 11.6 percent by weight determined as rare earth oxides.

The following cracking data was obtained when the catalyst was evaluated for cracking gas oil at 900° F.

Cracking data

| | |
|---|---|
| Conversion, vol. percent | 64.6 |
| LHSV | 4.0 |
| 10 R.V.P. gaso., vol. percent | 56.0 |
| Excess $C_4$'s, vol. percent | 10.5 |
| $C_5$+gasoline, vol. percent | 52.6 |
| Total $C_4$'s, vol. percent | 13.9 |
| Dry gas, wt. percent | 6.4 |
| Coke, wt. percent | 3.6 |
| $H_2$, wt. percent | 0.034 |

Δ advantage

| | |
|---|---|
| 10 R.V.P. gaso., vol. percent | +9.0 |
| Excess $C_4$'s, vol. percent | −5.0 |
| $C_5$+gasoline, vol. percent | +7.7 |
| Total $C_4$'s, vol. pehcent | −3.7 |
| Dry gas, wt. percent | −2.1 |
| Coke, wt. percent | −1.8 |

EXAMPLE 26

The procedure of Example 25 was repeated with the exception that the catalyst was steamed for 30 hours at 1200° F. with steam at 15 p.s.i.g.; the cracking data of the catalyst is shown below.

Cracking data

| | |
|---|---|
| Conversion, vol. percent | 51.0 |
| LHSV | 4.0 |
| 10 R.V.P. gaso., vol. percent | 46.9 |
| Excess $C_4$'s, vol. percent | 7.4 |
| $C_5$+gasoline, vol. percent | 44.5 |
| Total $C_4$'s, vol. percent | 9.9 |
| Dry gas, wt. percent | 4.2 |
| Coke, wt. percent | 1.9 |
| $H_2$ wt. percent | 0.02 |

Δ advantage

| | |
|---|---|
| 10 R.V.P. gaso., vol. percent | +6.8 |
| Excess $C_4$'s, vol. percent | −3.5 |
| $C_5$+gasoline, vol. percent | +6.6 |
| Total $C_4$'s, vol. percent | −3.3 |
| Dry gas, wt. percent | −2.1 |
| Coke, wt. percent | −1.2 |

EXAMPLE 27

10 parts by weight of a synthetic crystalline aluminosilicate, identified as Zeolite 13X, were dispersed into 90 parts by weight of a silica-alumina matrix, and the resulting composition treated with a 2 percent by weight aqueous solution of rare earth chlorides for 24 continuous hours, followed by three 16 hour contacts and nine 2 hour contacts with a 2 percent by weight aqueous solution of manganese chloride. The treated composition was then washed with water until the effluent contained no chloride ions, dried, and then treated for 30 hours at 1200° F. with steam at 15 p.s.i.g. to yield a catalyst having a sodium content of 0.29 percent by weight, a rare earth content determined as rare earth oxides of 4.48 percent by weight, and a manganese content determined as manganese at 3.18 percent by weight.

The following cracking data was obtained when the catalyst was evaluated for cracking gas oil at 900° F.

Cracking data

| | |
|---|---|
| Conversion, vol. percent | 42.4 |
| LHSV | 4.0 |
| 10 R.V.P. gaso., vol. percent | 38.0 |
| Excess $C_4$'s, vol. percent | 6.5 |
| $C_5$+gasoline, vol. percent | 35.9 |
| Total $C_4$'s, vol. percent | 8.6 |
| Dry gas, wt. percent | 4.1 |
| Coke, wt. percent | 1.6 |
| $H_2$, wt. percent | 0.04 |

Δ advantage

| | |
|---|---|
| 10 R.V.P. gaso., vol. percent | +2.8 |
| Excess $C_4$'s, vol. percent | −1.9 |
| $C_5$+gasoline, vol. percent | +2.9 |
| Total $C_4$'s, vol. percent | −2.1 |
| Dry gas. wt. percent | +0.6 |
| Coke, wt. percent | −0.4 |

EXAMPLE 28

25 parts by weight of a synthetic crystalline aluminosilicate, identified as Zeolite 13X, were dispersed into 75 parts by weight of a silica-alumina matrix and the resulting composition treated with an aqueous solution containing 1 percent by weight rare earth chloride and 1 percent by weight calcium chloride. The composition was then washed with water until there were no chloride ions in the effluent, dried, and then treated for 10 hours at 1200° F. with steam at 15 p.s.i.g. to yield a catalyst having a sodium content of 0.14 percent by weight.

The following cracking data was obtained when the catalyst was evaluated for cracking gas oil at 875° F.

Cracking data

| | |
|---|---|
| Conversion, vol. percent | 71.5 |
| LHSV | 3.0 |
| 10 R.V.P. gaso., vol. percent | 52.5 |
| Excess $C_4$'s, vol. percent | 18.4 |
| $C_5$+gasoline, vol. percent | 50.7 |
| Total $C_4$'s, vol. percent | 20.3 |
| Dry gas, wt. percent | 7.9 |
| Coke, wt. percent | 6.4 |
| $H_2$, wt. percent | |

Δ advantage

| | |
|---|---|
| 10 R.V.P. gaso., vol. percent | +5.7 |
| Excess $C_4$'s, vol. percent | −3.3 |
| $C_5$+gasoline, vol. percent | +6.3 |
| Total $C_4$'s, vol. percent | −3.9 |
| Dry gas, wt. percent | −2.0 |
| Coke, wt. percent | −1.1 |

EXAMPLE 29

The procedure of Example 28 was repeated with the exception that the treatment with steam was carried out for 30 hours.

The following cracking data was obtained upon evaluation for cracking gas oil.

Cracking data

| | |
|---|---|
| Conversion, volume percent | 70.4 |
| LHSV | 3.0 |
| $C_5$+gasoline, vol. percent | 52.2 |
| Total $C_4$'s, vol. percent | 19.4 |
| Dry gas, wt. percent | 6.9 |
| Coke, wt. percent | 5.1 |

Δ advantage

| | |
|---|---|
| $C_5$+gasoline, vol. percent | +8.9 |
| Total $C_4$'s, vol. percent | −4.3 |
| Dry gas, wt. percent | −2.0 |
| Coke, wt. percent | −2.0 |

EXAMPLE 30

The precedure of Example 28 was carried out with the exception that the treatment with steam was for 60 hours.

The following shows the cracking data obtained.

Cracking data

| | |
|---|---|
| Conversion, volume percent | 69.3 |
| LHSV | 3.0 |
| $C_5$+gasoline, vol. percent | 54.0 |
| Total $C_4$'s, vol. percent | 17.8 |
| Dry gas, wt. percent | 6.2 |
| Coke, wt. percent | 4.13 |

Δ advantage

| | |
|---|---|
| $C_5$+gasoline, vol. percent | +10.4 |
| Total $C_4$'s, vol. percent | −5.4 |
| Dry gas, wt. percent | −3.4 |
| Coke, wt. percent | −2.5 |

Δ advantage

| | |
|---|---|
| 10 R.V.P. gaso., vol. percent | — |
| Excess $C_4$'s, vol. percent | — |
| $C_5$+gasoline, vol. percent | +10.4 |
| Total $C_4$'s, vol. percent | −5.4 |
| Dry gas. wt. percent | −3.4 |
| Coke, wt. percent | −2.5 |

EXAMPLE 31

A synthetic sodium aluminosilicate identified as Zeolite 13X was base-exchanged with rare earth chloride hexahydrate in a semi-continuous manner to reduce the sodium content of the aluminosilicate to 1.3 weight percent. Two pounds of this material was then base-exchanged continuously with ninety pounds of a 5 percent by weight rare earth chloride hexahydrate solution at 180° F. The resulting composition was washed with water until there were no chloride ions in the effluent, dried at 230° F. and calcined for ten hours at 1000° F. The calcined product analyzed 0.49 weight percent sodium. Fifteen grams of the calcined aluminosilicate were added to 153 grams of McNamee clay (kaolin) which had been dried at 230° F. (88.4 weight percent solids as determined at 1000° F.). The mixture was blended for 2 minutes in a Waring Blendor, followed by rolling in a jar for an additional one hour to insure good mixture. The mixture was then pelleted and sized to 4x10 mesh, calcined 10 hours at 1000° F. and steamed for 24 hours at 1200° F. with steam at 15 p.s.i.g.

The following data was obtained when the above catalyst was evaluated for cracking a Mid-Continent gas oil at 900° F.:

Cracking data

| | |
|---|---|
| Conversion, vol. percent | 61.6 |
| LHSV | 4 |
| C/O | 1.5 |
| $C_5$+gasoline, vol. percent | 51.9 |
| Total $C_4$'s, vol. percent | 13.3 |
| Dry gas, wt. percent | 4.6 |
| Coke, wt. percent | 2.7 |
| $H_2$, wt. percent | 0.10 |

Δ advantage

| | |
|---|---|
| $C_5+$gasoline, vol. percent | +8.6 |
| Total $C_4$'s, vol. percent | −3.4 |
| Dry gas, wt. percent | −3.5 |
| Coke, wt. percent | −2.0 |

EXAMPLE 32

A synthetic sodium aluminosilicate identified as Zeolite 13X was base-exchanged with rare earth chloride hexahydrate in a semi-continuous batch process using 1.15 equivalents of rare earth per equivalent of sodium. The treatment was carried out at 160–180° F. for a period of time to reduce the sodium content to 1.3 weight percent. 35.5 grams of this base-exchanged material (74.9 weight percent solids as determined at 1000° F.) was added to 277 grams of Halloysite clay (81.3 weight percent solids as determined at 1000° F.) and mixed with 600 cc. of water in a blender for 2 minutes. Following the mixing the composite was dried for 16 hours at 230° F., pelleted and sized to 4x10 mesh, then calcined for 10 hours at 1000° F. and steamed for 24 hours at 1200° F. with 15 p.s.i.g. steam. The same sample was steamed at the same conditions to 72 hours and re-evaluated.

The following data was obtained when the above catalyst was evaluated for cracking gas oil under the CAT-C test.

CRACKING DATA

| | Steamed for— | |
|---|---|---|
| | 24 hrs. | 72 hrs. |
| Conditions: | | |
| LHSV | 4 | 4 |
| C/O | 1.5 | 1.5 |
| Conversion, vol. percent | 64.4 | 65.8 |
| $C_5+$gasoline, vol. percent | 54.3 | 57.1 |
| Total $C_4$'s, vol. percent | 12.7 | 12.0 |
| Dry gas, wt. percent | 5.7 | 5.5 |
| Coke, wt. percent | 2.4 | 2.2 |
| $H_2$, wt. percent | 0.03 | 0.02 |
| Δ advantage over Si/Al | | |
| $C_5+$gasoline, vol. percent | +9.6 | +11.7 |
| Total $C_4$'s, vol. percent | −5.0 | −6.2 |
| Dry gas, wt. percent | −2.8 | −3.2 |
| Coke, wt. percent | −2.8 | −3.0 |

Examples 33 through 36 illustrate the preparation of catalyst compositions comprising a minor proportion of rare earth aluminosilicates with a major proportion of a material which will dilute and temper the activity thereof. Compositing was accomplished by mixing the components and extending.

EXAMPLE 33

A catalyst composition was prepared which contained 5.5 weight percent rare earth Zeolite X (about 0.5 wt. percent of Na), 16.6 weight percent kaolin (38 percent weight $Al_2O_3$, 46 percent weight $SiO_2$, and 14 percent weight ignition loss), and 77.9 weight percent barytes.

EXAMPLE 34

A catalyst composition was prepared which contained 96.2 weight percent barytes and 3.8 weight percent rare earth Zeolite X (about 0.5 wt. percent of Na).

EXAMPLE 35

A catalyst composition was prepared which contained 5 weight percent rare earth Zeolite X (1.9 weight percent Na) and 95 weight percent zirconia.

EXAMPLE 36

A catalyst composition was prepared which contained 10 weight percent rare earth Zeolite X (1.9 weight percent Na) and 90 weight percent kaolin clay.

The catalysts prepared in Examples 33–36 were evaluated for cracking n-decane. The operating conditions and results are shown below in Table I.

TABLE I.—n-DECANE CRACKING RESULTS

| Example | 33 | | | 34 | | | 35 | | | 36 | | |
|---|---|---|---|---|---|---|---|---|---|---|---|---|
| Temp., °F | 901 | | | 900 | | | 902 | | | 903 | | |
| LHSV | 1.0 | | | 1.0 | | | 1.0 | | | 1.0 | | |
| Cat./oil, vol./vol. | 4.0 | | | 4.0 | | | 4.0 | | | 4.0 | | |
| Conversion, percent wt. | 100 | 88.3 | 66.6 | 95.2 | 67.3 | 51.6 | 97.4 | 67.9 | 48.9 | 100 | 100 | 74.2 |
| Sample time, min | 3 | 8 | 13 | 3 | 8 | 13 | 3 | 8 | 13 | 3 | 8 | 13 |
| Product distribution, percent wt.: | | | | | | | | | | | | |
| $C_1$'s | | | | | | | 1.4 | 1.5 | 1.1 | 1.9 | 2.0 | 1.5 |
| $C_2$'s | 7.7 | 4.6 | 3.1 | 4.5 | 3.3 | 2.4 | 2.9 | 2.1 | 1.5 | 4.0 | 3.7 | 2.3 |
| $C_3$'s | 51.2 | 21.0 | 16.6 | 25.2 | 15.4 | 11.5 | 22.5 | 14.0 | 10.0 | 37.3 | 27.6 | 18.8 |
| $C_4$'s | | 25.8 | 19.0 | 29.0 | 18.1 | 13.9 | 28.8 | 16.9 | 11.7 | 37.0 | 32.3 | 20.4 |
| $C_5$'s | 27.9 | 20.1 | 14.8 | 21.0 | 15.6 | 12.2 | 25.0 | 18.3 | 13.1 | 14.5 | 23.1 | 18.4 |
| $C_6$'s | 7.7 | 11.3 | 8.9 | 10.7 | 10.0 | 8.1 | 10.6 | 10.2 | 7.6 | 1.2 | 6.2 | 8.7 |
| $C_7$'s | 1.1 | 1.9 | 1.9 | 1.6 | 2.2 | 1.8 | 1.4 | 1.8 | 1.7 | 0.9 | 0.7 | 1.0 |
| $C_8$'s | 2.6 | 1.5 | 1.1 | 1.3 | 1.2 | 0.8 | 2.1 | 1.2 | 1.0 | 2.1 | 2.2 | 1.5 |
| $C_9$'s | 1.8 | 2.0 | 1.2 | 1.8 | 1.6 | 1.0 | 2.6 | 1.9 | 1.3 | 0.9 | 2.1 | 1.6 |
| $C_{10}$'s | 0.0 | 11.7 | 33.4 | 4.8 | 32.7 | 48.4 | 2.6 | 32.1 | 51.1 | 0.0 | 0.0 | 25.8 |

EXAMPLE 37

155 grams of Zeolite 13X (96.8 weight percent solids) was contacted with 1610 cc. of 0.1 molar rare earth chloride hexahydrate solution for 24 hours at 180° F., then water washed free of chloride ion and dried at 230° F. To 59.8 grams of the dried (83.6 weight percent solids) rare earth aluminosilicate, which contained 6.3 weight percent sodium, were added 229 grams of McNamee clay and 600 cc. of water. The mixture was blended for 2 minutes and the slurry then dried at 230° F., sized to 4 x 10 mesh, and calcined for 10 hours at 1000° F. The calcined product was steamed for 20 hours at 1225° F. with steam at atmospheric pressure and thereafter resteamed for 24 hours at 1200° F. with steam at 15 p.s.i.g.

Catalytic evaluation of the above catalyst for cracking gas oil at 900° F. indicated exceptional results as shown below.

CRACKING DATE

| | Steamed for 20 hrs. | Resteamed for 24 hrs. |
|---|---|---|
| Conversion, vol. percent | 62.6 | 60.9 |
| LHSV | 1.5 | 1.5 |
| $C_5+$gasoline, vol. percent | 53.0 | 52.7 |
| Total $C_4$'s, vol. percent | 12.3 | 11.9 |
| Dry gas, wt. percent | 5.6 | 5.1 |
| Coke, wt. percent | 2.5 | 1.6 |
| $H_2$, wt. percent | 0.04 | 0.04 |
| Δ advantage over Si/Al | | |
| $C_5+$gasoline, vol. percent | +9.2 | +9.8 |
| Total $C_4$'s, vol. percent | −4.8 | −4.6 |
| Dry gas, wt. percent | −2.6 | −2.9 |
| Coke, wt. percent | −2.4 | −3.0 |

The catalysts described herein may be used to catalyze a wide variety of acid catalyzed hydrocarbon conversion processes. A typical example is the use of such catalysts for hydrocracking hydrocarbon fractions such as gas oils, residual oils, cycle stocks, whole topped crudes and heavy hydrocarbon fractions derived by the destructive hydrogenation of coal, tars, pitches, asphalts, and the like. The hydrogenation component can include metals, oxides and sulfides of metals of the Periodic Table which fall in Group V including vanadium, Group VI including chromium, molybdenum, tungsten and the like, and Group VIII including cobalt, nickel, platinum, palladium, rhodium and the like, and combinations of metals, sulfides and oxides of metals of the foregoing such as nickel-tungsten sulfide, cobalt-molybdenum oxide, cobalt-molybdenum sulfide and the like. The amount of hydrogenation component can range from about 0.1 to about 30 weight percent based on the catalyst. The hydrogenation component may be combined with the matrix composite in any feasible manner, such as impregnation, coprecipitation, cogellation, mechanical admixture and the like. The hydrogenation operation is generally carried out at a temperature between about 400° F. and about 950° F. The hydrogen pressure in such operation is generally within the range of about 100 and about 3000 p.s.i.g. and, preferably, about 350 to about 2000 p.s.i.g. The liquid hourly space velocity, i.e. the liquid volume of hydrocarbon per hour per volume of catalyst is between about 0.1 and about 10. In general, the molar ratio of hydrogen to hydrocarbon charge employed is between about 2 and about 80, and preferably, between about 5 and about 50.

EXAMPLE 38

In this example, a hydrocracking catalyst was prepared from a silica-alumina bead hydrogel containing 25 weight percent crystalline aluminosilicate which had been base exchanged with a solution containing 2 weight percent rare earth chloride hexahydrate for nine two-hour contacts and three sixteen-hour contacts. The product contained 0.44 weight percent sodium, 14.9 weight percent rare earth oxides, 11.5 weight percent aluminum oxide and the balance silica. 46.3 grams of this product was impregnated with 6.4 grams ammonium molybdate dissolved in water and adjusted to 36.6 cc. volume. The catalyst was dried at 230° F. and then re-impregnated under vacuum with 5.06 grams $CoCl_2 \cdot 6H_2O$ in 36.6 cc. total solution. The resulting product, after removal from the impregnating solution, was dried 16 hours at 230° F. in air and calcined 10 hours at 1000° F. in air. The final catalyst analyzed 3.08 weight percent cobalt oxide, 8.8 weight percent molybdenum oxide and 0.05 weight percent chlorine.

The above hydrocracking catalyst was evaluated using a Mid-Continent gas oil and the results are shown below.

Hydrocracking data

| | |
|---|---|
| Days on stream | 3.5 |
| Reactor temp., ° F. | 749 |
| Conversion, vol. percent (650° F.) | 73.1 |
| Dry gas, wt. percent | 2.4 |
| Total $C_4$'s, vol. percent | 10.8 |
| Total $C_5$'s, vol. percent | 9.2 |
| Light naphtha, vol. percent | 6.5 |
| Heavy naphtha, vol. percent | 34.1 |
| Light fuel oil, vol. percent | 27.3 |
| $C_4$+product, vol. percent | 115.4 |
| $C_5$+product, vol. percent | 104.6 |
| $H_2$ consumption, SCF/bbl. | 1181 |
| Product quality: | |
| Heavy naphtha 170–390° F.— | |
| API gravity | 53.2 |
| Light fuel oil 390–650 ° F.— | |
| API gravity | 34.6 |
| Diesel index | 64.4 |
| Heavy fuel oil 650° F.— | |
| API gravity | 32.3 |

EXAMPLE 39

This example illustrates the use of the catalysts described herein for dealkylation of alkyl aromatic hydrocarbons.

25 parts by weight of a synthetic crystalline aluminosilicate, identified as Zeolite 13X, were dispersed into 75 parts by weight of a silica-alumina matrix. The resulting composition was then subjected to 4 sixteen-hour contacts followed by 13 two-hour contacts with an aqueous solution consisting of 2 percent by weight of rare earth chloride hexahydrate. The aluminosilicate was then washed with water until the effluent was substantially free of chloride ions, dried, calcined 10 hours at 1000° F. and then treated for 30 hours at 1225° F. with steam at 15 p.s.i.g. The rare earth aluminosilicate thus obtained contained 0.65 weight percent sodium and 15.4 weight percent rare earths, determined as rare earth oxides.

Using the catalyst prepared above, toluene was dealkylated to benzene by passing 60 cc./minute of helium saturated with toluene at room temperature over a 3 millimeter sample of the catalyst at 1000° F. for one hour to obtain 18.6 weight percent benzene.

What is claimed is:

1. A catalyst composition characterized by a total sodium content of less than about 4 weight percent comprising a porous matrix and a crystalline aluminosilicate zeolite the cations of which consist essentially of metal characterized by a substantial portion of rare earth metal, said aluminosilicate having a structure of rigid three-dimensional networks and uniform pore openings of a size greater than 4 angstroms and less than 15 angstroms.

2. The composition of claim 1 wherein the sodium content is less than about 1 weight percent.

3. A catalyst composition having a total sodium content of less than about 4 weight percent comprising a porous matrix selected from the group consisting of silica-alumina and clay and a crystalline aluminosilicate zeolite the cations of which consist essentially of metal characterized by a substantial portion of rare earth metal, said aluminosilicate having a structure of rigid three-dimensional networks and uniform pore openings of a size greater than 4 angstroms and less than 15 angstroms.

4. The composition of claim 3 wherein the sodium content is less than about 1 weight percent.

5. A catalyst composition having a total sodium content of less than about 1 weight percent and comprising a major portion of a porous matrix of silica-alumina and up to about 25 percent by weight of a crystalline aluminosilicate zeolite having a structure of rigid three-dimensional networks and uniform pore openings of a size greater than 4 angstroms and less than 15 angstroms intermixed with said matrix, the cations of said aluminosilicate consisting essentially of metal characterized by a substantial portion of rare earth metal.

6. A catalyst composition having a total sodium content of less than about 4 weight percent, said composition comprising a finely divided crystalline aluminosilicate zeolite, the cations of which consist essentially of metal characterized by a substantial portion of rare earth metal, said aluminosilicate having a structure of rigid three-dimensional networks and uniform pore openings of a size greater than 4 angstroms and less than 15 angstroms, interspersed with a porous, catalytically active matrix material possessing lower level catalytic activity than the crystalline aluminosilicate.

7. The composition of claim 6 wherein, in addition to rare earth metal ions, the crystalline aluminosilicate contains cations selected from the group consisting of calcium, magnesium, manganese, chromium, aluminum, zirconium, vanadium, nickel, cobalt, iron, and mixtures of the foregoing.

8. The composition of claim 6 wherein the matrix is a silica-alumina material selected from the group consisting of natural clay, chemically treated clay and calcined clay.

9. The composition of claim 8 wherein said clay is selected from the group consisting of kaolinites, halloysites, montmorillonite, and mixtures of the foregoing.

10. A catalyst composition having a total sodium content of about less than 1 weight percent comprising a major proportion of a porous catalytically active matrix of silica-alumina and up to 25 percent by weight of finely divided crystalline aluminosilicate zeolite the cations of which consist essentially of metal characterized by a substantial portion of rare earth metal, said aluminosilicate having a structure of rigid three-dimensional networks and uniform pore openings or a size greater than 6 angstrom units and less than 15 angstroms, said zeolite having a catalytic activity which is substantially greater than that of said matrix.

11. The composition of claim 10 wherein the crystalline aluminosilicate is derived from caustic treated clay.

12. The composition of claim 10 wherein the silica-alumina matrix comprises a member selected from the group consisting of natural clay, chemically treated clay and calcined clay.

13. The composition of claim 10 wherein the porous matrix is a synthetic silica-alumina gel.

14. A catalyst composition having a total sodium content of less than 1 weight percent comprising a major proportion of a porous catalytically active matrix of silica-alumina selected from the group consisting of natural halloysite, chemically treated halloysite and calcined halloysite and from 2 to 25 percent by weight of a finely divided crystalline aluminosilicate zeolite the cations of which consist essentially of metal characterized by a substantial proportion of rare earth metal, said aluminosilicate having the crystallographic structure of faujasite.

15. The composition of claim 14 wherein the aluminosilicate has a silica to alumina ratio greater than three.

16. The composition of claim 14 wherein the aluminosilicate has a silica to alumina ratio less than three.

17. A process for preparing a catalyst composition having a total alkali metal content less than about 4 weight percent, which comprises:
(1) contacting a crystalline alkali metal aluminosilicate having uniform pore openings of a size greater than 4 angstroms and less than 15 angstroms with a base exchange solution of metal salts only, characterized by the presence of rare earth metal cations, for a period of time sufficient to replace a substantial amount of said alkali metal with metal cations a substantial portion of which are rare earth metal cations; and
(2) incorporating the aluminosilicate product in a porous matrix.

18. The process of claim 17 wherein the porous matrix is selected from the group consisting of synthetic and natural silica-alumina containing materials.

19. A process for preparing a catalyst composition having a total alkali metal content less than about 1 weight percent which comprises:
(a) contacting an alkali metal aluminosilicate having the crystallographic structure of faujasite derived from caustic treatment of clay with a base exchange solution of metal salts only, characterized by the presence of rare earth metal cations, for a period of time sufficient to replace a substantial amount of alkali metal with metal cations a substantial portion of which are rare earth metal cations; and
(b) incorporating the aluminosilicate product, in an amount up to 25% by weight, in a porous catalytically active matrix selected from the group consisting of natural clay, chemically treated clay and calcined clay.

References Cited
UNITED STATES PATENTS

| | | | |
|---|---|---|---|
| 2,971,903 | 2/1961 | Kimberlin | 252—455 X |
| 3,114,695 | 12/1963 | Rabo et al. | 252—455 X |
| 3,140,252 | 7/1964 | Frilette et al. | 252—455 X |
| 3,140,322 | 7/1964 | Frilette et al. | 252—455 X |
| 3,173,854 | 3/1965 | Eastwood et al. | 252—455 X |

DANIEL E. WYMAN, Primary Examiner

C. F. DEES, Assistant Examiner

U.S. Cl. X.R.
208—120

Disclaimer 3,459,680.—*Charles J. Plank*, Woodbury, and *Edward J. Rosinski*, Deptford, N.J. CRYSTALLINE ZEOLITE COMPOSITE FOR CATALYTIC HYDROCARBON CONVERSION. Patent dated Aug. 5, 1960. Disclaimer filed May 22, 1969, by the assignee, *Mobil Oil Corporation*.

Hereby disclaims the terminal portion of the term of the patent subsequent to July 7, 1981.

[*Official Gazette November 18, 1969.*]

Corrected Disclaimer 3,459,680.—*Charles J. Plank*, Woodbury, and *Edward J. Rosinski*, Deptford, N.J. CRYSTALLINE ZEOLITE COMPOSITE FOR CATALYTIC HYDROCARBON CONVERSION. Patent dated Aug. 5, 1969. Disclaimer filed May 22, 1969, by the assignee, *Mobil Oil Corporation*.

Hereby disclaims the terminal portion of the term of the patent subsequent to July 7, 1981.

This disclaimer supersedes the disclaimer issued Nov. 18, 1969.

[*Official Gazette January 27, 1970.*]

PO-1050
(5/69)

UNITED STATES PATENT OFFICE
CERTIFICATE OF CORRECTION

Patent No. 3,459,680          Dated August 5, 1969

Inventor(s) CHARLES J. PLANK and EDWARD J. ROSINSKI

It is certified that error appears in the above-identified patent and that said Letters Patent are hereby corrected as shown below:

In the caption insert "The portion of the term of the patent subsequent to July 7, 1981 has been disclaimed."

Column 1, line 28 "field" should be --filed--.

Column 1, line 48 "field" should be --filed--.

Column 4, line 31 "inctude" should be --include--.

Column 5, line 74 "intreconnected" should be --interconnected--

Column 9, line 54 "lest" should be --least--.

Column 10, line 4 "wall" should be --well--.

Column 10, line 6 "etheyl" should be --ethyl--.

Column 10, line 14 Delete "what" before "lower".

Column 10, line 61 "reulting" should be --resulting--.

Column 11, line 19 "deliverately" should be --deliberately--.

Column 16, line 29 "solutioin" should be --solution--.

Column 17, line 24 "990°F." should be --900°F.--.

Column 18, line 5 "terated" should be --treated--.

Column 18, line 39 "900°C." should be --900°F.--.

Column 19, lines 40 and 41 "crystaline" should be --crystallin

Signed and sealed this 15th day of September 1970.

(SEAL)
Attest:

EDWARD M. FLETCHER, JR.
Attesting Officer

WILLIAM E. SCHUYLER, JR.
Commissioner of Patents

UNITED STATES PATENT OFFICE
CERTIFICATE OF CORRECTION

Patent No. 3,459,680            August 5, 1969

Charles J. Plank et al.

It is certified that error appears in the above identified patent and that said Letters Patent are hereby corrected as shown below:

Column 19, line 72, "5" should be -- 6 --. Column 24, line 40, "Total $C_4$'s, vol. pehcent" should be -- Total $C_4$'s, vol. percent --. Column 31, line 11, "or" should be -- of --.

Signed and sealed this 20th day of October 1970.

(SEAL)
Attest:

Edward M. Fletcher, Jr.            WILLIAM E. SCHUYLER, JR.
Attesting Officer            Commissioner of Patents